(12) United States Patent
Matsumura et al.

(10) Patent No.: US 7,090,615 B2
(45) Date of Patent: Aug. 15, 2006

(54) METHOD OF CONTROLLING A VEHICLE AND SYSTEM OF CONTROLLING THE SAME

(75) Inventors: Tetsuo Matsumura, Chiyoda-ku (JP);
Naoyuki Ozaki, Chiyoda-ku (JP);
Kinya Fujimoto, Chiyoda-ku (JP);
Kentaro Shishido, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 10/839,296

(22) Filed: May 6, 2004

(65) Prior Publication Data

US 2004/0224820 A1 Nov. 11, 2004

(30) Foreign Application Priority Data

May 7, 2003 (JP) .............................. 2003-128547

(51) Int. Cl.
*B60W 10/02* (2006.01)

(52) U.S. Cl. ...................................................... 477/78

(58) Field of Classification Search ................ 477/107, 477/111, 109, 78; 74/335
See application file for complete search history.

(56) References Cited

U.S. PATENT DOCUMENTS

| 4,627,312 | A | * | 12/1986 | Fujieda et al. | 477/124 |
| 5,313,856 | A | * | 5/1994 | Schneider et al. | 477/80 |
| 6,679,133 | B1 | * | 1/2004 | Kayano et al. | 74/335 |
| 6,896,641 | B1 | * | 5/2005 | Matsumura et al. | 477/115 |

FOREIGN PATENT DOCUMENTS

| JP | 63083436 A | 4/1988 |
| JP | 2703169 B2 | 10/1997 |
| JP | 2001213201 A | 8/2001 |

* cited by examiner

*Primary Examiner*—Dirk Wright
(74) *Attorney, Agent, or Firm*—Crowell & Moring LLP

(57) ABSTRACT

At the time of shifting from one gear train among a plurality of gear trains to another gear train, a transmission for controlling a transfer torque variable mechanism and supplementing torque during shifting, during a period of transferring at least a part of torque of an engine by the transfer torque variable means, controls so as to generate engine torque larger than engine torque before the period at least once and carries out shifting.

17 Claims, 17 Drawing Sheets

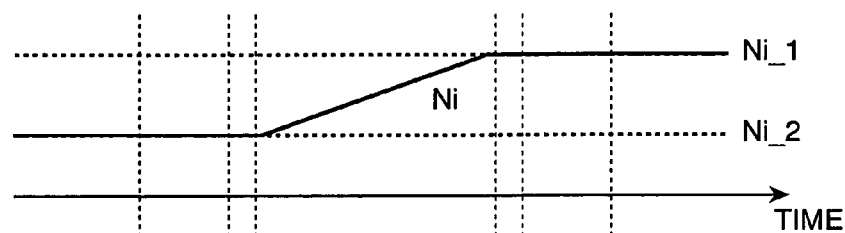
FIG. 11a
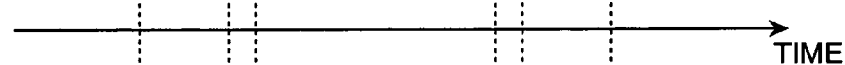
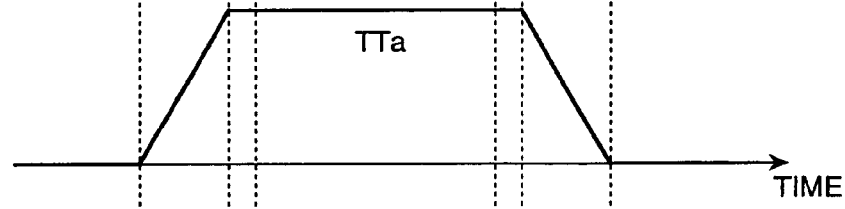
FIG. 11b
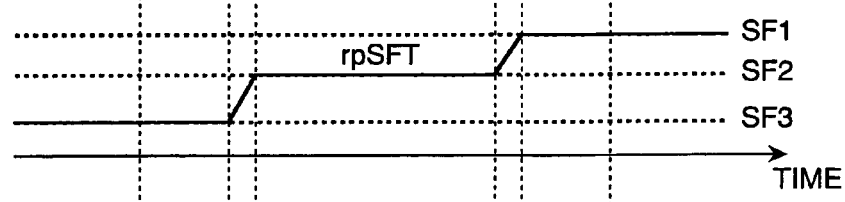
FIG. 11c
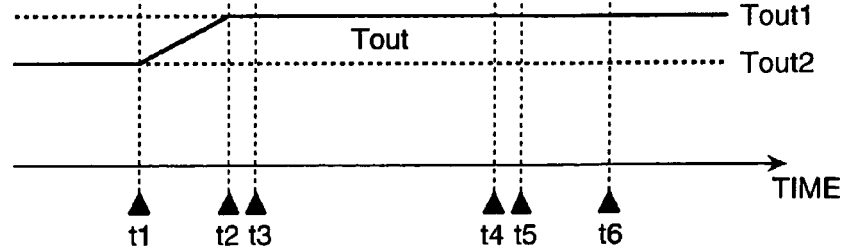
FIG. 11d
FIG. 11e Ohlala# METHOD OF CONTROLLING A VEHICLE AND SYSTEM OF CONTROLLING THE SAME

BACKGROUND OF THE INVENTION

The present invention relates to a control method and apparatus for an automobile, a control apparatus for a transmission, and an automobile and more particularly to a control method and apparatus for a gear type manual transmission which is automated and an automobile.

An automobile using a manual transmission is superior in fuel expenses to an automobile loading a transmission using a torque converter, though a linked operation of a clutch and an accelerator at the time of start is difficult. If the linked operation of the clutch and accelerator at the time of start is not performed well, when the clutch is engaged, a great shock is caused or when the clutch pressure is insufficient, the so-called blowup phenomenon that the engine speed is increased suddenly is generated. Further, when the engine speed is insufficient, if the clutch is intended to be engaged suddenly or if the automobile is started on a sloping road, the so-called engine stall that the engine is stopped is caused.

To solve these problems, a system that the clutch and gear change is automated using a mechanism of a manual transmission, that is, an automated manual transmission (hereinafter referred to as an automated MT) has been developed. However, under the control by a conventional automated MT at the time of shifting, the drive torque is interrupted due to the disengage and engage operation of the clutch and a sense of incompatibility may be given to an occupant.

As a conventional automated MT, there is a shifting method for an automobile having an automatic transmission equipped with an assist clutch of a friction clutch which is a transfer torque variable means. For example, such method is disclosed by Patent Japanese Patent 2703169. The method, when shifting, controls the assist clutch, thereby transfers the drive torque by the assist clutch during shifting, avoids interruption of the drive torque, and realizes smooth shifting.

Further, as a conventional automated MT, there is a shifting method for an automobile having an automatic transmission equipped with a one-way clutch and a friction clutch composed of two transfer torque variable means. For example, Such method is disclosed by Japanese Laid-Open Patent Publication No. Sho 63-83436. The method, when shifting, also controls the friction clutch, thereby avoids interruption of the drive torque during shifting, and realizes smooth shifting.

Further, there is a shifting method for an automobile having an automatic transmission equipped with a synchronization means by friction which is an embodiment of the transfer torque variable means. For example, such method is disclosed by Japanese Laid-Open Patent Publication No. 2001-213201. The method, when shifting, also controls the transfer torque variable means, thereby avoids interruption of the drive torque during shifting, and realizes smooth shifting.

According to the aforementioned, when the shifting is started, the input torque to the transmission is transferred by the transfer torque variable means, thus the torque transferred by the gear before shifting is released, and the gear is disengaged, and the engine speed is controlled by transferring the drive torque by the transfer torque variable means, and at the point of time when the input shaft speed of the transmission is synchronized with the speed equivalent to the next gear position, the gear at the next gear position is engaged, and thereafter the transfer torque variable means is disengaged, thus the shifting is carried out.

SUMMARY OF THE INVENTION

Before and after such a gear engagement of the automobile, due to the difference between the gear ratio of the gears connected by the transfer torque variable means and the gear ratio at the current gear position or the gear ratio at the next gear position after shifting, torque differences are generated in the output shaft torque and a sense of pull-in is caused.

Further, in the down-shift, when the engine torque is kept at a predetermined value and the speed is synchronized by controlling the assist clutch, the speed is increased by reducing the transfer torque of the transfer torque variable means, so that there is the possibility of occurrence of a sense of pull-in.

With the foregoing in view, an object of the present invention is to propose a control method for an automobile shifting the gear without causing a sense of pull-in during shifting.

The present invention, during a period of transferring at least a part of the torque of a driving power source to the drive wheels by the transfer torque variable means at the time of shifting, increases at least once the torque of the driving power source or the input shaft torque of the transmission than the torque before start of the period.

Or, the driving source is controlled so as to make the input shaft torque during a period of switching the torque transfer path larger than the input shaft torque before the switching period.

BRIEF DESCRIPTION OF THE DRAWINGS

FIG. 11 is a time chart of each signal during the down-shift from the second gear position to the first gear position;

DESCRIPTION OF THE PREFERRED EMBODIMENTS

The embodiments of the present invention will be explained in detail with reference to FIGS. 1 to 17.

Firstly, the first configuration example of the control apparatus for an automobile relating to the present invention will be explained by referring to FIG. 1.

Figure 1:
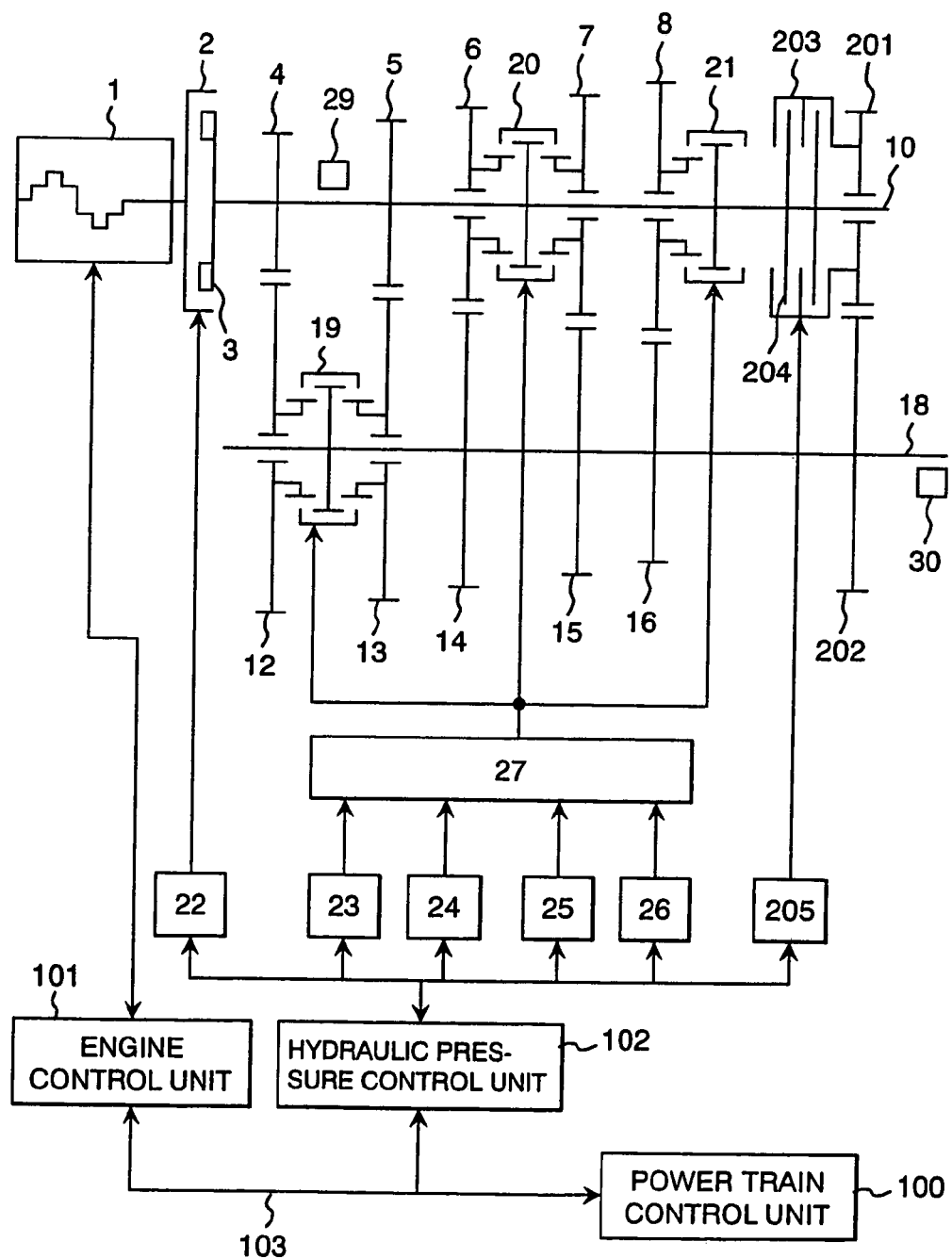
FIG. 1 is a whole block diagram of the automatic transmission of the first embodiment of the present invention.

FIG. 1 is a skeleton diagram of the first system configuration example showing an embodiment of the control apparatus for an automobile relating to the present invention.

An engine 1 which is a driving power source, an engine speed sensor (not shown in the drawing) for measuring the speed of the engine 1, an electronic throttle (not shown in the drawing) for adjusting the engine torque, and a fuel injector (not shown in the drawing) for injecting the fuel amount corresponding to the intake air amount are installed. The intake air amount, fuel amount, and ignition time are operated by an engine control unit 101, thus the torque of the engine 1 can be controlled with high accuracy. With respect to the fuel injector, there are an air intake port injection system for injecting fuel to the air intake port and an intra-cylinder injection system for injecting fuel directly into the cylinder. However, it is advantageous to use an engine of a system having good exhaust performance capable of reducing fuel expenses by comparing the operating area (area decided by the engine torque and engine speed) required for the engine. The driving power source may be not only a gasoline engine but also a diesel engine, a natural gas engine, or a motor.

To the engine 1, an input shaft clutch input disk 2 is connected and when the input shaft clutch input disk 2 and an input shaft clutch output disk 3 are engaged or disengaged, the torque of the engine 1 can be transferred to or interrupted from a transmission input shaft 10. The input shaft clutch generally uses a dry type single plate system, though it can use various friction transfer means such as a wet type multi-plate clutch and an electromagnetic clutch. To control the pressing force (the input shaft clutch torque) between the input shaft clutch input disk 2 and the input shaft clutch output disk 3, an actuator 22 driven by hydraulic pressure is used and by adjusting the pressing force (the input shaft clutch torque), the output of the engine 1 can be transferred to or interrupted from the input shaft 10.

On the input shaft 10, a first drive gear 4, a second drive gear 5, a third drive gear 6, a fourth drive gear 7, a fifth drive gear 8, a backward drive gear (not shown in the drawing), and a seventh drive gear 201 are installed. The first drive gear 4 and the second drive gear 5 are fixed to the transmission input shaft 10 and the third drive gear 6, the fourth drive gear 7, the fifth drive gear 8, the backward drive gear, and the seventh drive gear 201 are rotatably installed on the transmission input shaft 10. Further, as an input shaft speed detection means, a sensor 29 for detecting the speed of the transmission input shaft 10 is installed.

On the other hand, on a transmission output shaft 18, a first driven gear 12, a second driven gear 13, a third driven gear 14, a fourth driven gear 15, a fifth driven gear 16, and a backward driven gear (not shown in the drawing) are installed. The first driven gear 12 and the second driven gear 13 are rotatably installed on the transmission output shaft 18 and the third driven gear 14, the fourth driven gear 15, the fifth driven gear 16, the backward driven gear, and a seventh driven gear 202 are fixed to the transmission output shaft 18.

Further, as an output shaft speed detection means, a sensor 30 for detecting the speed of the transmission output shaft 18 is installed.

With respect to these gears, the first driven gear 12 and the first drive gear 4, the second driven gear 13 and the second drive gear 5, the third driven gear 14 and the third drive gear 6, the fourth driven gear 15 and the fourth drive gear 7, the fifth driven gear 16 and the fifth drive gear 8, and the backward driven gear and the backward drive gear via an inversion gear (not shown in the drawing) are respectively meshed and the seventh driven gear 202 and the seventh drive gear 201 are meshed.

And, between the first driven gear 12 and the second driven gear 13, a first mesh type transfer means 19 for engaging the first driven gear 12 with the transmission output shaft 18 and engaging the second driven gear 13 with the transmission output shaft 18 is installed. Therefore, the rotation torque transferred from the first drive gear 4 to the first driven gear 12 or from the second drive gear 5 to the second driven gear 13 is transferred to the transmission output shaft 18 via the first mesh type transfer means 19.

Further, between the third drive gear 6 and the fourth drive gear 7, a second mesh type transfer means 20 for engaging the third drive gear 6 with the transmission input shaft 10 and engaging the fourth drive gear 7 with the transmission input shaft 10 is installed. Therefore, the rotation torque transferred to the third drive gear 6 or the fourth drive gear 7 is transferred to the third driven gear 14 or the fourth driven gear 15 via the second mesh type transfer means 20 and transferred to the transmission output shaft 18.

Further, on the fifth drive gear 8, a third mesh type transfer means 21 for engaging the fifth drive gear 8 with the transmission input shaft 10 is installed. Therefore, the rotation torque transferred to the fifth drive gear 8 is transferred to the fifth driven gear 16 via the third mesh type transfer means 21 and transferred to the transmission output shaft 18. Here, the control apparatus may be structured by using a synchromesh mechanism which has a friction transfer means in place of the mesh type transfer means, smoothly adjusts the speed by frictional force, and can transfer the torque by meshing.

As mentioned above, to transfer the rotation torque of the transmission input shaft 10 to the transmission output shaft 18, it is necessary to move any one of the first mesh type transfer means 19, the second mesh type transfer means 20, and the third mesh type transfer means 21 in the axial direction of the transmission input shaft 10 or the transmission output shaft 18 and engage it with any one of the first driven gear 12, the second driven gear 13, the third drive gear 6, the fourth drive gear 7, and the fifth drive gear 8. To move any one of the first mesh type transfer means 19, the second mesh type transfer means 20, and the third mesh type transfer means 21, by a shift first actuator 23, a shift second actuator 24, a select first actuator 25, and a select second actuator 26, a shift/select mechanism 27 is operated. By engaging any one of the first mesh type transfer means 19, the second mesh type transfer means 20, and the third mesh type transfer means 21 with any of the first driven gear 12, the second driven gear 13, the third drive gear 6, the fourth drive gear 7, and the fifth drive gear 8, the rotation torque of the transmission input shaft 10 can be transferred to the transmission output shaft 18 via any one of the first mesh type transfer means 19, the second mesh type transfer means 20, and the third mesh type transfer means 21. In this case, on the shift/select mechanism 27, to prevent gear disengagement during moving, a position holding mechanism (not shown in the drawing) for holding the gear position is installed.

Further, the input shaft 10 is equipped with assist clutches 203 and 204 which are one method of the transfer torque variable means, and the seventh drive gear 201 and the assist clutch input disk 203 are connected, and the transmission input shaft 10 and the assist clutch output disk 204 are connected. When the assist clutch input disk 203 and the assist clutch output disk 204 are engaged with each other, the torque of the seventh driven gear 202 can be transferred to the transmission output shaft 18.

To control the pressing force (the assist clutch torque) between the assist clutch input disk 203 and the assist clutch output disk 204, an actuator 205 driven by hydraulic pressure is used and by adjusting the pressing force (the assist clutch torque), the output of the engine 1 can be transferred.

The transfer torque variable means may be structured by using a friction transfer means or an electric generator. Here, the friction transfer means is a means for transferring torque generating frictional force by pressing force of the frictional surface and a typical one is a friction clutch. As a friction clutch, there are a dry type single plate clutch, a wet type multi-plate clutch, and an electromagnetic clutch available. In this embodiment, the assist clutches 203 and 204 use a wet type multi-plate clutch. However, other various transfer torque variable means can be used.

As mentioned above, the rotation torque of the transmission input shaft 10 transferred to the transmission output shaft 18 from the first drive gear 4, the second drive gear 5, the third drive gear 6, the fourth drive gear 7, the fifth drive gear 8, and the seventh drive gear 201 via the first driven gear 12, the second driven gear 13, the third driven gear 14, the fourth driven gear 15, the fifth driven gear 16, and the seventh driven gear 202 is transferred to the vehicle shaft (not shown in the drawing) via a differential gear (not shown in the drawing) connected to the transmission output shaft 18.

The input shaft clutch actuator 22 for generating pressing force (input shaft clutch torque) between the input shaft clutch input disk 2 and the input shaft clutch output disk 3 and the assist clutch actuator 205 for generating pressing force (assist clutch torque) between the assist clutch input disk 203 and the assist clutch output disk 204 are controlled by a hydraulic pressure control unit 102. The current of a solenoid valve (not shown in the drawing) installed on each actuator is controlled, thereby the stroke amount of a hydraulic cylinder (not shown in the drawing) installed on each actuator is adjusted, thus the hydraulic pressure of each actuator is controlled, and the transfer torque of each clutch is controlled.

Further, by the hydraulic pressure control unit 102, the currents of solenoid valves (not shown in the drawing) installed on the select first actuator 25 and the select second actuator 26 are controlled and the stroke amount of a hydraulic cylinder (not shown in the drawing) installed on each actuator is adjusted. By doing this, the hydraulic pressure of each actuator is controlled, and the select position is moved, thus which one is to be moved, the first mesh type transfer means 19, the second mesh type transfer means 20, or the third mesh type transfer means 21 is selected.

Further, by the hydraulic pressure control unit 102, the currents of solenoid valves (not shown in the drawing) installed on the shift first actuator 23 and the shift second actuator 24 are controlled and the stroke amount of a hydraulic cylinder (not shown in the drawing) installed on each actuator is adjusted. By doing this, the hydraulic pressure of each actuator is controlled and the load for operating the first mesh type transfer means 19, the second mesh type transfer means 20, or the third mesh type transfer means 21 can be controlled.

It is selected to pressurize the select first actuator 25, depressurize the select second actuator 26, and move the first mesh type transfer means 19. Furthermore, the shift first actuator 23 is pressurized, and the shift second actuator 24 is depressurized, and the shift load is controlled, thus the shift position is controlled. By doing this, the first mesh type transfer means 19 and the first driven gear 12 are meshed and the first gear position is realized. Further, the shift first actuator 23 is depressurized, and the shift second actuator 24 is pressurized, and the shift load is controlled, thus the shift position is controlled. By doing this, the first mesh type transfer means 19 and the second driven gear 13 are meshed and the second gear position is realized.

It is selected to pressurize both the select first actuator 25 and the select second actuator 26 and move the second mesh type transfer means 20. Furthermore, the shift first actuator 23 is pressurized, and the shift second actuator 24 is depressurized, and the shift load is controlled, thus the shift position is controlled. By doing this, the second mesh type transfer means 20 and the third drive gear 6 are meshed and the third gear position is realized. Further, the shift first actuator 23 is depressurized, and the shift second actuator 24 is pressurized, and the shift load is controlled, thus the shift position is controlled. By doing this, the second mesh type transfer means 20 and the fourth drive gear 7 are meshed and the fourth gear position is realized.

It is selected to pressurize the select first actuator 25, depressurize the select second actuator 26, and move the third mesh type transfer means 21. Furthermore, the shift first actuator 23 is pressurized, and the shift second actuator 24 is depressurized, and the shift load is controlled, thus the shift position is controlled. By doing this, the third mesh type transfer means 21 and the fifth drive gear 8 are meshed and the fifth gear position is realized.

Both the shift first actuator 23 and the shift second actuator 24 are pressurized, and the shift load is controlled, thereby the shift position is controlled, thus the gears are disengaged to the neutral.

In this embodiment, for the shift first actuator 23, the shift second actuator 24, the select first actuator 25, and the select second actuator 26 for driving the shift/select mechanism 27, hydraulic actuators are used. However, a constitution of an electric actuator using a motor may be used. Further, in place of the shift first actuator 23 and the shift second actuator 24, a constitution of one actuator may be used and in place of the select first actuator 25 and the select second actuator 26, a constitution of one actuator may be used. Further, as a mechanism for operating the first mesh type transfer means 19, the second mesh type transfer means 20, and the third mesh type transfer means 21, a constitution using a shifter rail and a shifter fork or a constitution using other means for moving the mesh type transfer means 19, 20, and 21 such as a drum type may be used.

Further, in this embodiment, for the input shaft clutch actuator 22 and the assist clutch actuator 205, hydraulic actuators are used. However, a constitution of an electric actuator using a motor may be used.

Further, in this embodiment, the hydraulic actuators are used, so that the hydraulic pressure control unit 102 for controlling the hydraulic actuators is used. However, when electric actuators using a motor are used, a motor control unit fulfills the function in place of the hydraulic pressure control unit 102.

Next, the second configuration example of the control apparatus for an automobile relating to the present invention will be explained by referring to FIG. 2.

Figure 2:
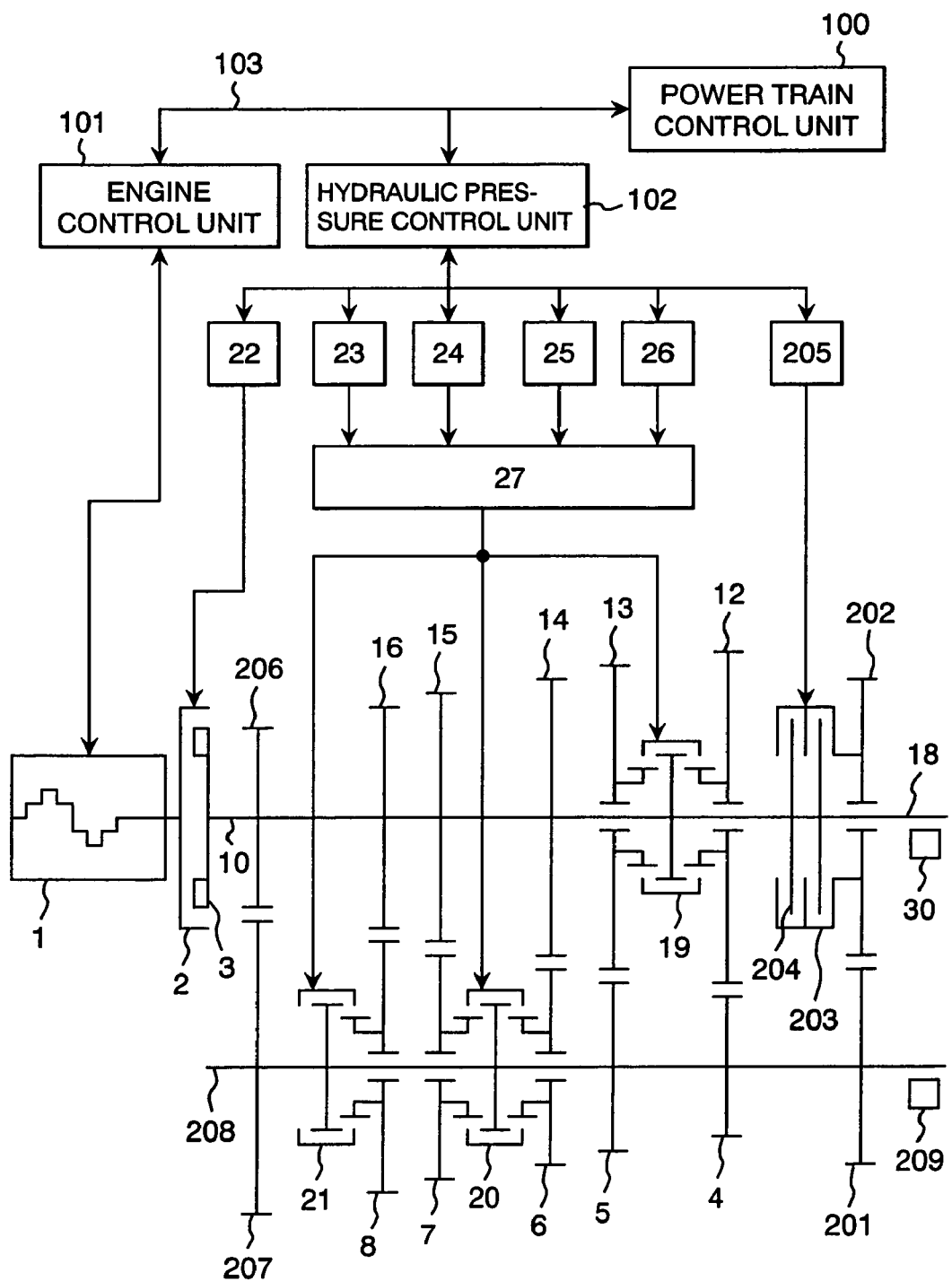
FIG. 2 is a whole block diagram of the automatic transmission showing the second embodiment of the present invention.

FIG. 2 is a skeleton diagram of the second system configuration example showing an embodiment of the control apparatus for an automobile relating to the present invention. Further, the same numerals as those shown in FIG. 1 indicate the same parts.

A difference of this configuration example from the configuration example shown in FIG. 1 is that the configuration example shown in FIG. 1 is composed of two shafts of the transmission input shaft 10 and the transmission output shaft 18, while this configuration example is composed of three shafts including a counter shaft 208. Namely, the power of the engine 1 is transferred to an input driven gear 207 from an input drive gear 206 and transferred to the transmission output shaft 18 from the counter shaft 208 via the first drive gear 4, the second drive gear 5, the third drive gear 6, the fourth drive gear 7, the fifth drive gear 8, the backward drive gear (not shown in the drawing), and the seventh drive gear 201 and the first driven gear 12, the second driven gear 13, the third driven gear 14, the fourth driven gear 15, the fifth driven gear 16, the backward driven gear (not shown in the drawing), and the seventh driven gear 202.

As mentioned above, the clutch installed on the gear train on the input shaft 10 or the gear train on the output shaft 18 is engaged or disengaged, thus a plurality of torque transfer paths transferred from the engine 1 which is a driving source to the output shaft 18 are switched to carry out shifting. Further, the assist clutches 203 and 204 constituting one torque transfer path have a function for supplementing the transfer torque between the input and output shafts when another torque transfer path is to be switched.

In the configuration examples shown in FIGS. 1 and 2, the gear ratio between the seventh drive gear 201 and the seventh driven gear 202 connecting the assist clutches which are one method of the transfer torque variable means is set between the gear ratio at the third gear position composed of the third drive gear 6 and the third driven gear 14 and the gear ratio at the fourth gear position composed of the fourth drive gear 7 and the fourth driven gear 15. However, the set gear ratio of the transfer torque variable means is not limited to it. For example, it may be set to the gear ratio between the third gear position and the fourth gear position or may be set to a one equivalent to the third gear position, the fourth gear position, or the highest gear position. Further, in place of the mesh type transfer means set as a predetermined gear position, the transfer torque variable means can be installed. Furthermore, a plurality of transfer torque variable means can be set at various gear positions.

As mentioned above, the present invention is a gear type transmission having a plurality of gear trains, which has a plurality of torque transfer means (mechanisms) between the input shaft and the output shaft of the transmission and can be applied to various transmissions wherein at least one of the torque transfer means (mechanisms) is a transfer torque variable means.

Figure 3:
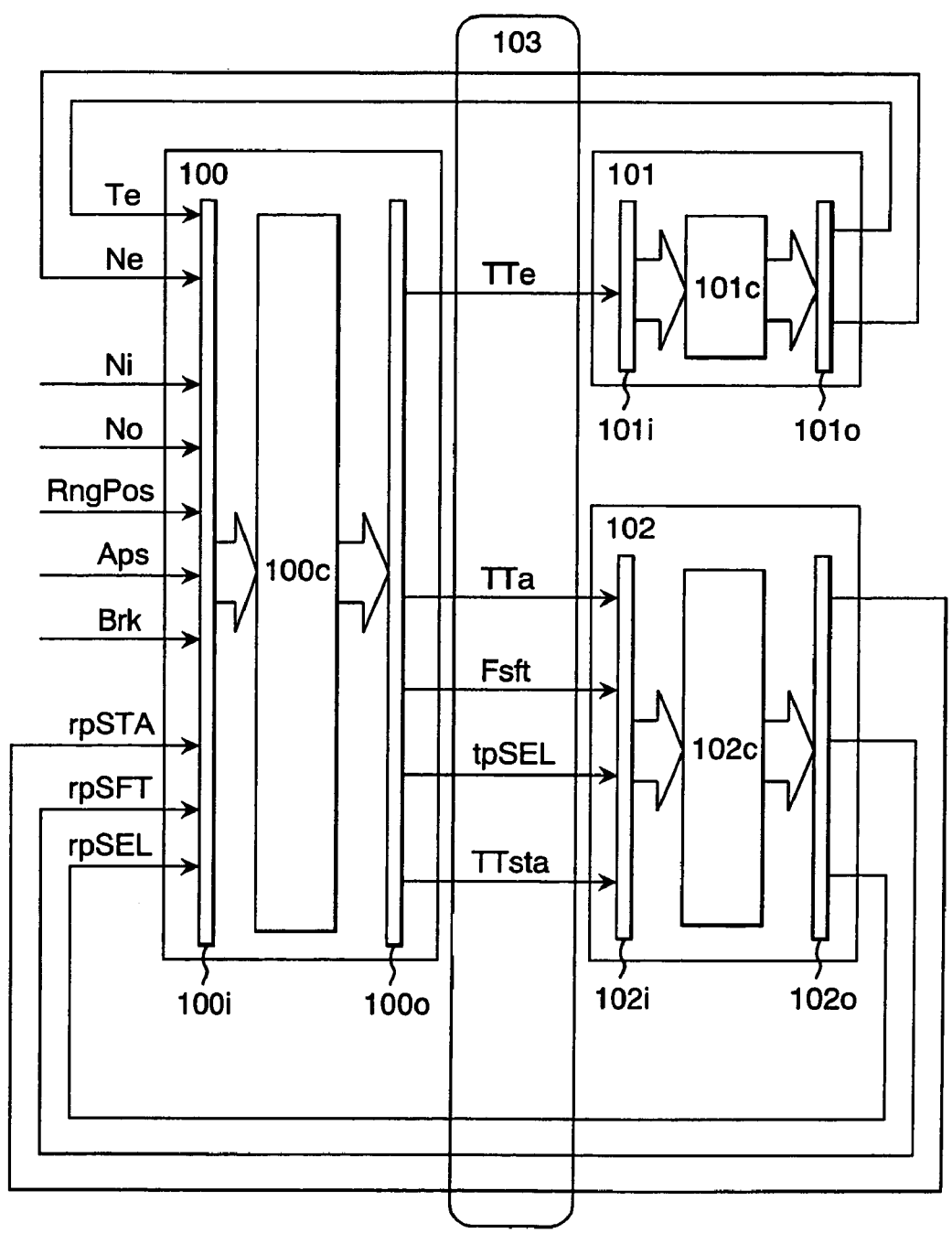
FIG. 3 is an input-output signal diagram between the power train control unit, the engine control unit, and the hydraulic pressure control unit shown in FIG. 1.

FIG. 3 shows an input and output signal relationship by a communication means 103 between the power train control unit 100, the engine control unit 101, and the hydraulic pressure control unit 102 when the configuration examples shown in FIGS. 1 and 2 are practiced.

The power train control unit 100 is structured as a control unit having an input unit 100*i*, an output unit 100*o*, and a computer 100*c*. Similarly, the engine control unit 101 is also structured as a control unit having an input unit 101*i*, an output unit 101*o*, and a computer 101*c* and the hydraulic pressure control unit 102 is also structured as a control unit having an input unit 102*i*, an output unit 102*o*, and a computer 102*c*. These units mutually transmit and receive signals via the communication means 103 (a signal medium passing through the area surrounded by 103 shown in FIG. 3, the medium kind is no particular object).

An engine torque instruction value TTe is transmitted from the power train control unit 100 to the engine control unit 101 using the communication means 103 and the engine control unit 101, to realize TTe, controls the intake air amount of the engine 1, fuel amount, and ignition time (not shown in the drawing). Further, the engine control unit 101 internally has a detection means (not shown in the drawing) of engine torque which is input torque to the transmission, detects or calculates the speed Ne of the engine 1 and the engine torque Te generated by the engine 1, and transmits them to the power train control unit 100 using the communication means 103. For the engine torque detection means, a torque sensor may be used or an inference means using engine parameters such as an injection pulse width of an injector, pressure in an air intake pipe, and engine speed may be used.

From the power train control unit 100 to the hydraulic pressure control unit 102, an input shaft clutch target torque TTsta, a target shift load Fsft, a target select position tpSEL, and an assist clutch target torque TTa are transmitted and the hydraulic pressure control unit, to realize the input shaft clutch target torque TTsta, controls the input shaft clutch actuator 22 and engages or disengages the input shaft clutch input disk 2 and the input shaft clutch output disk 3. Further, the hydraulic pressure control unit, to realize the target shift load Fsft and the target select position tpSEL, controls the shift first actuator 23, the shift second actuator 24, the select first actuator 25, and the select second actuator 26, operates the shift/select mechanism 27, thereby controls the shift position and select position, and engages or disengages the first mesh type transfer means 19, the second mesh type transfer means 20, and the third mesh type transfer means 21. Further, the hydraulic pressure control unit, to realize the assist clutch target torque TTa, controls the assist clutch actuator 205 and engages or disengages the assist clutch input disk 203 and the assist clutch output disk 204.

Further, the hydraulic pressure control unit 102 detects a position signal rpSTA, a shift position signal rpSFT, and a select position signal rpSEL which indicate engagement and disengagement of the input shaft clutch and transmits them to the power train control unit 100.

Further, to the power train control unit 100, from the input shaft speed sensor 29 and the output shaft speed sensor 30, the input shaft speed Ni and the output shaft speed No are respectively input and a range position signal RngPos indicating the shift lever position such as range P, range R, range N, and range D and an ON/OFF signal Brk from the brake switch for detecting an accelerator pedal position Aps and whether the brake is stepped on or not are input.

The power train control unit 100, for example, when a driver sets the shift range to range D and steps on the accelerator pedal, judges that he has a will of start and acceleration or when he steps on the brake pedal, judges that he has a will of deceleration and stop, and to realize the intention of the driver, sets the engine torque instruction value TTe, the input shaft clutch target torque TTsta, the target shift load Fsft, and the target select position tpSEL. Further, the power train control unit 100 sets the gear position from the vehicle speed Vsp calculated from the output shaft speed No and the accelerator pedal position Aps and to execute the shifting operation to the set gear position, sets the engine torque instruction value TTe, the input shaft clutch target torque TTsta, the target shift load Fsft, the target select position tpSEL, and the assist clutch target torque TTa.

Here, when the target shift load Fsft>0, the hydraulic pressure control unit 102, to move the shift position toward the first gear position, third gear position, and fifth gear position, controls the shift first actuator 23 and the shift second actuator 24 and when Fsft<0, the hydraulic pressure control unit 102, to move the shift position toward the second gear position and fourth gear position, controls the shift first actuator 23 and the shift second actuator 24.

In this embodiment, the hydraulic pressure control unit 102 and the engine control unit 101 are controlled by the power train control unit 100. The power train control unit 100, the engine control unit 101, and the hydraulic pressure control unit 102 mutually transmit and receive information by the communication means 103. These units may not be independent units, or one unit may serve as another unit, or one unit may fulfill all the functions. Further, the power train control unit and/or the hydraulic pressure control unit may be replaced with a transmission control apparatus. In this case, the transmission control apparatus outputs a signal requesting for the engine, which is a driving source, to output necessary torque to the engine control unit 101.

Next, by referring to FIGS. 4 to 11, the contents of shift control by the control apparatus for an automobile in this embodiment will be explained.

Figure 4:
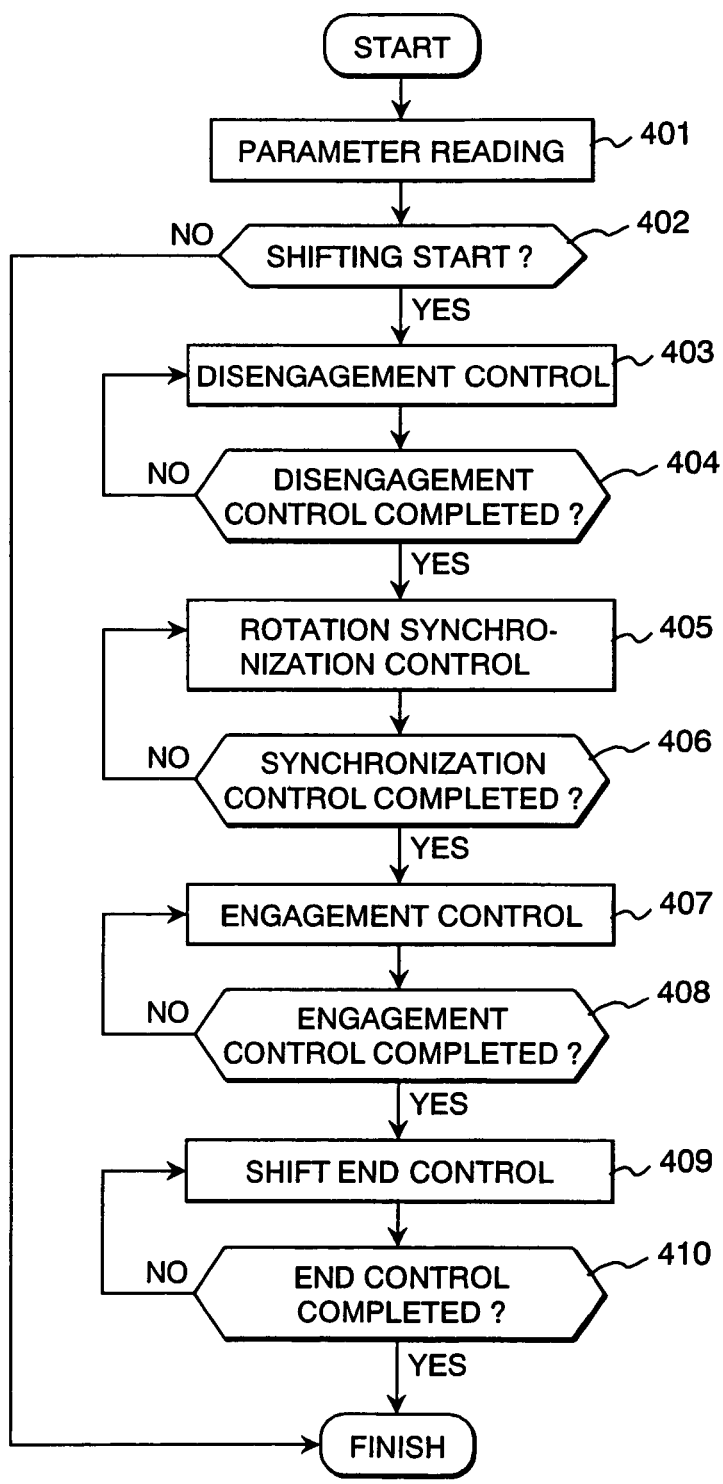
FIG. 4 is a control flow chart of the shift phase of an embodiment of the present invention.

Firstly, by referring to FIG. 4, the entire contents of shift control by the control apparatus for an automobile in this embodiment will be explained. FIG. 4 is a flow chart showing the contents of shift control by the control apparatus for an automobile in the embodiment using the constitution shown in FIG. 3. The contents of shift control indicated below are programmed in the computer 10c of the power train control unit 100 and are executed repeatedly in a predetermined cycle. Namely, in this embodiment, the processes at Steps 401 to 410 are executed by the power train control unit 100.

At Step 401, the power train control unit 100 reads the parameter. At Step 402, the power train control unit 100 sets the gear position from the vehicle speed Vsp and the accelerator pedal position Aps and when the shifting operation is started, the unit 100 goes to Step 403 (disengagement control phase) to disengage the gear.

At Step 403, the power train control unit 100 executes disengagement control and at Step 404, decides whether the disengagement control is completed or not. When the disengagement control is completed, the unit 100 goes to Step 405 and when it is not completed, the unit 100 executes Step 403 again. The decision at Step 404 is a decision of whether the shift position rpSFT is a position which can be decided as a disengagement position or not. Assuming the threshold values for deciding as a disengagement position respectively as SF1OFF and SF3OFF, SF1OFF≧rpSFT≧SF3OFF. Here, SF1OFF and SF3OFF, among the positions where the mesh type transfer means is not in the meshed state, are preferably in a wide range as possible. Further, the decision at Step 404 may be a decision that the shift position rpSFT begins movement to the disengagement position.

The power train control unit 100, at Step 405 (rotation synchronization control phase), controls the assist clutch torque so that the input speed synchronizes with the speed (target speed) equivalent to the next gear position and at Step 406, decides whether the rotation synchronization control is completed or not. The completion condition of the rotation synchronization control is that the rotation difference between the speed (target speed) at the next gear position and the input speed is small (|input speed Ni−output speed No×gear ratio γn at target gear position| is small) and the select position is the target position. For the decision of the rotation difference condition and select position condition, it is desirable to set a time delay. When the synchronization control is completed, to engage the gear, the unit 100 goes to Step 407 (engagement control phase) and when the synchronization control is not completed, the unit 100 goes to Step 405 again and continues the synchronization control.

The power train control unit 100, at Step 407, executes the engagement control and at Step 408, decides whether the engagement control is completed or not. Here, the engagement control completion condition is set to a case that the shift position is the target position. The decision of the shift position, for example, in a case of 2nd gear→3rd gear, assuming the threshold value for deciding 3rd gear engagement as SF3ON, rpSFT≧SF3. When the engagement control is completed, the unit 100 goes to Step 409 (shifting end phase) and when the engagement control is not completed, the unit 100 goes to Step 407 again and continues the engagement control.

At Step 410, the power train control unit 100 decides whether the shifting is completed or not. Here, the shifting end control completion condition is decided by whether the assist clutch target torque TTa is 0 or not. When the shifting is completed, the unit 100 finishes the process and when the shift control is not completed, the unit 100 continues Step 409 again.

Figure 5:
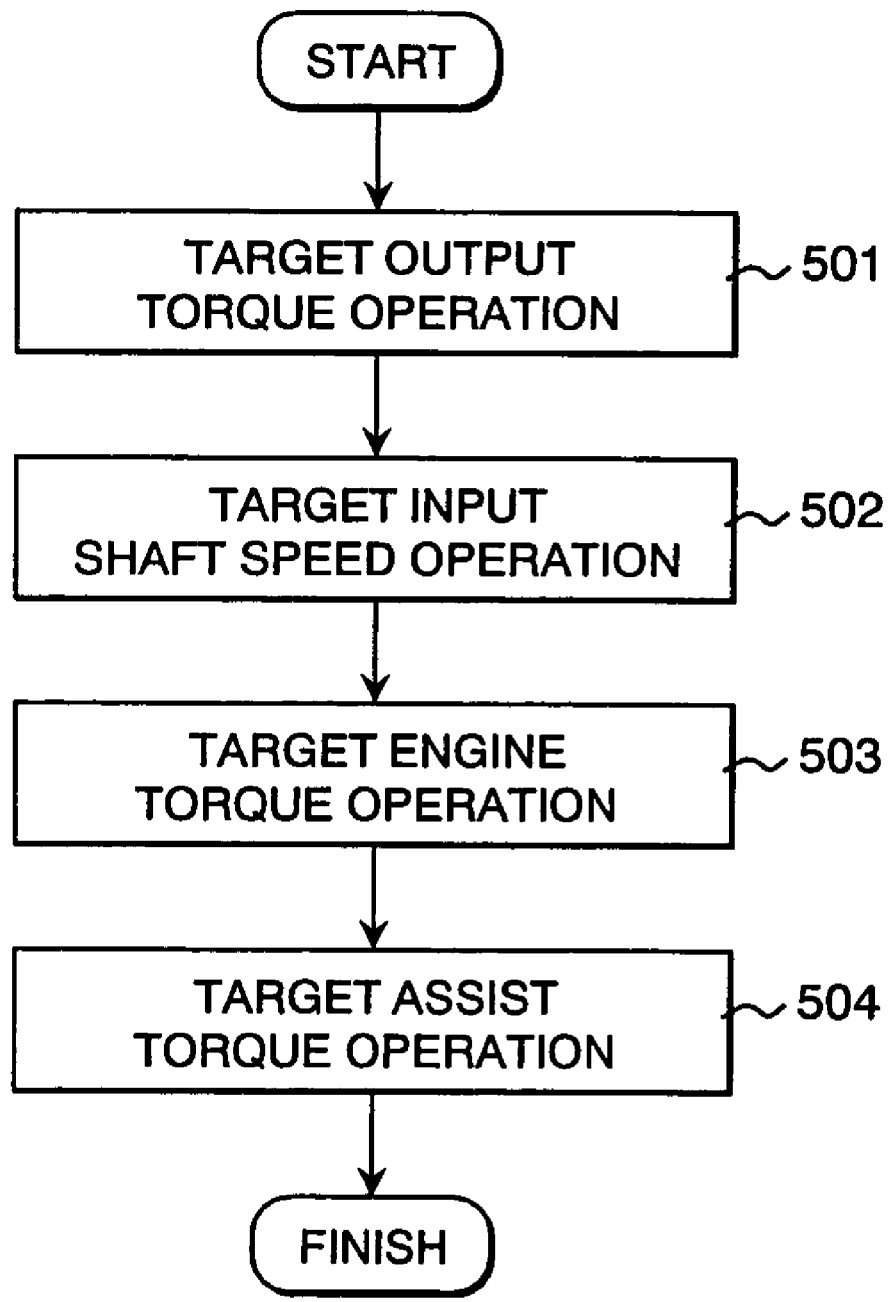
FIG. 5 is a control flow chart of the shift control of an embodiment of the present invention.

Next, by referring to FIGS. 5 to 11, the contents of shift control by the control apparatus for an automobile in this embodiment will be explained. FIG. 5 shows a shift control flow chart. The shift control flow is composed of Step 501 (target output torque operation), Step 502 (target input shaft speed operation), Step 503 (target engine torque operation), and Step 504 (target assist torque operation). The detailed Step 501 (target output torque operation) is shown in FIG. 6, the detailed Step 502 (target input shaft speed operation) in FIG. 7, the detailed Step 503 (target engine torque operation) in FIG. 8, and the detailed Step 504 (target assist torque operation) in FIG. 9.

Figure 6:
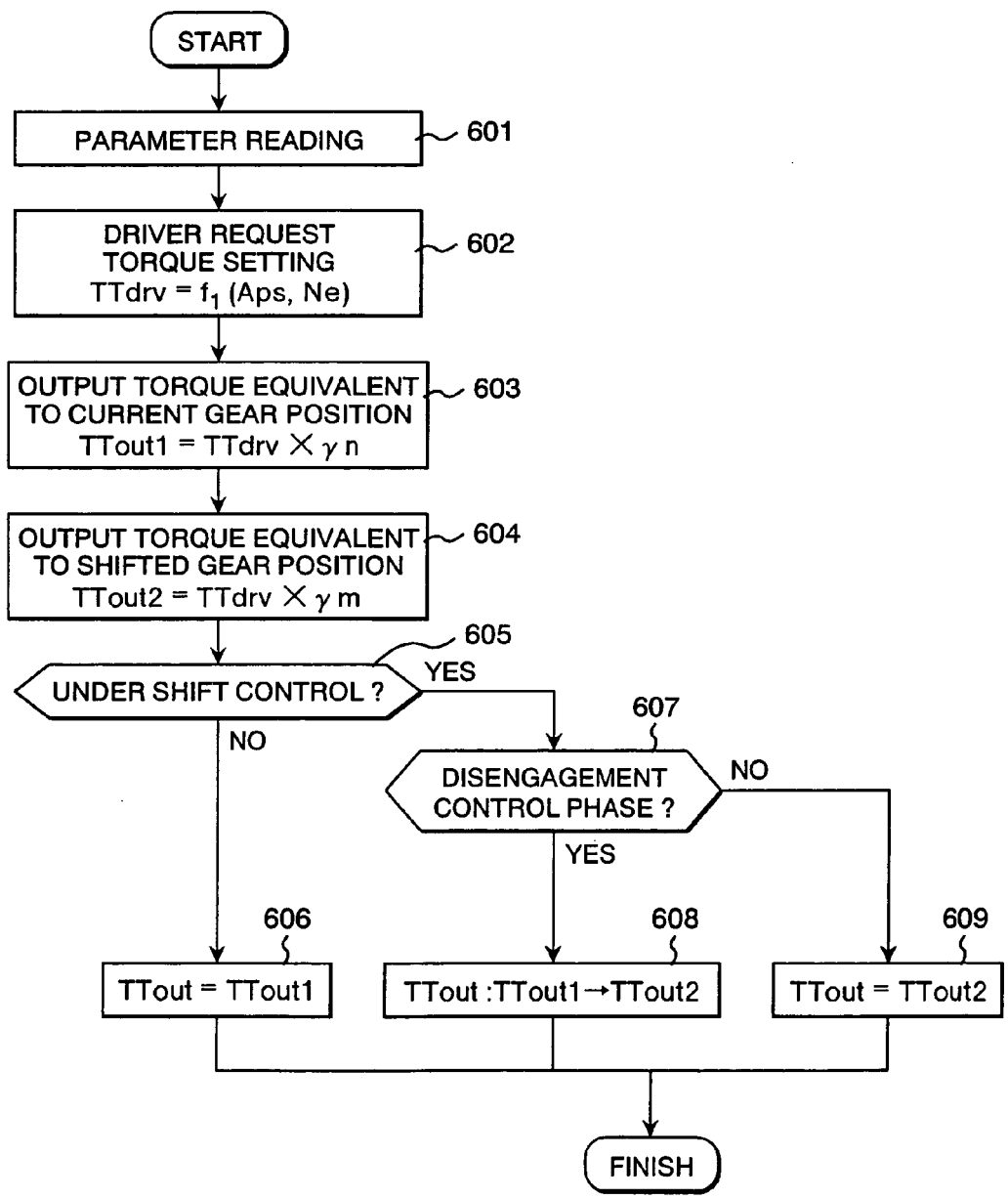
FIG. 6 is a control flow chart of the target output torque operation shown in FIG. 5.

FIG. 6 shows the control flow at Step 501 (target output torque operation) shown in FIG. 5. At Step 601, the power train control unit 100 reads the parameter. At Step 602, the power train control unit 100 calculates driver request torque. The driver request torque is structured so that for example, a data map is formed beforehand using the engine speed Ne and the accelerator pedal position Aps as input and the driver request torque is set according to the engine speed Ne and the accelerator pedal position Aps.

At Step 603, the power train control unit 100 calculates the output torque equivalent to the current gear position. The output torque equivalent to the current gear position TTout1 is calculated by multiplying the driver request torque by the current gear ratio γn.

Next, at Step 604, the power train control unit 100 calculates the output torque equivalent to the shifted gear position. The output torque equivalent to the shifted gear position TTout2 is calculated by multiplying the driver request torque by the shifted gear ratio γm.

At Step 605, the power train control unit 100 decides whether the process is during shifting or not and when the process is during shifting, the unit 100 goes to Step 607. When the process is not during shifting, the unit 100 goes to Step 606 and sets the target output torque TTout=TTout1.

At Step 607, the power train control unit 100 decides whether the process is in the disengagement control phase or not and when the process is not in the disengagement control phase, goes to Step 609. When the process is in the disengagement control phase, the unit 100 goes to Step 608 and slowly brings the target output torque TTout close to TTout2 from TTout1. Here, it is desirable to set the asymptotic time according to the driver request torque and furthermore, it is desirable to separately set it at each gear position. Furthermore, in place of the time, a constitution of setting a predetermined torque variation is also available.

At Step 609, the power train control unit 100 sets the target output torque TTout=TTout2. By use of such a constitution, the target output torque is slowly changed from the output torque equivalent to the current gear position Ttout1 to the output torque equivalent to the shifted gear position TTout2.

Figure 7:
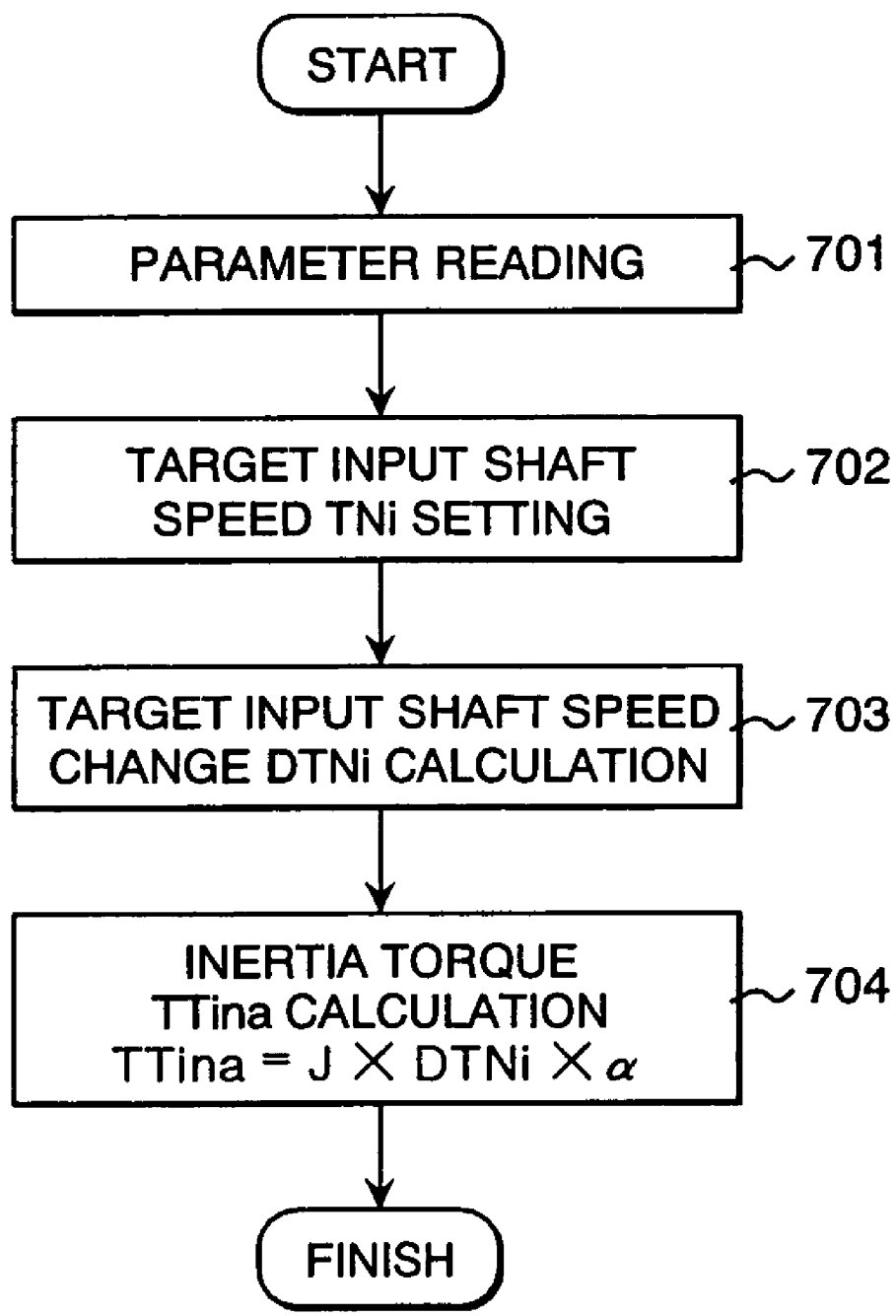
FIG. 7 is a control flow chart of the target input shaft speed operation shown in FIG. 5.

FIG. 7 shows the control flow at Step 502 (target input shaft speed operation) shown in FIG. 5. At Step 701, the power train control unit 100 reads the parameter.

At Step 702, the power train control unit 100 sets the target input shaft speed TNi. The target input shaft speed TNi, to slowly change it from the speed equivalent the current gear position to the speed equivalent to the shifted gear position during rotation synchronization, is set from the shift pattern and output shaft speed.

At Step 703, the power train control unit 100 calculates a change DTNi of the target input shaft speed TNi.

At Step 704, the power train control unit 100 calculates inertia torque TTina. Here, the inertia coefficient from the engine to the input shaft is assumed as J, and the unit conversion coefficient is assumed as α, and the inertia torque TTina is calculated from TTina=J×DTNi×α.

Figure 8:
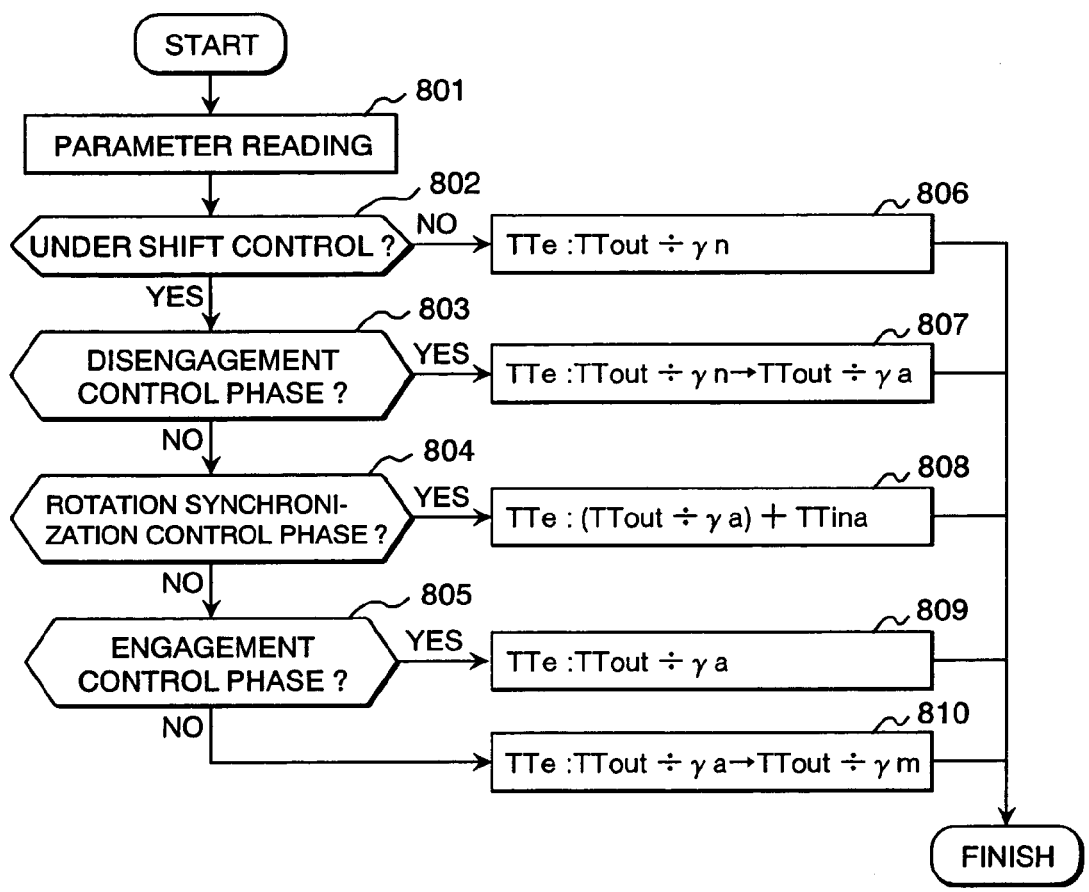
FIG. 8 is a control flow chart of the target engine torque control process shown in FIG. 5.

FIG. 8 shows the control flow at Step 503 (target engine torque operation) shown in FIG. 5. At Step 801, the power train control unit 100 reads the parameter.

At Step 802, the power train control unit 100 decides whether the process is during shifting or not and when the process is during shifting, the unit 100 goes to Step 803. When the process is not during shifting, at Step 806, the unit 100 sets the current gear ratio γn and sets the target engine torque TTe=TTout÷γn.

At Step 803, the power train control unit 100 decides whether the process is in the disengagement control phase or not and when the process is not in the disengagement control phase, goes to Step 804. When the process is in the disengagement control phase, at Step 807, the unit 100 sets the current gear ratio γn, sets the gear ratio at the assist clutch connection position as γa, and slowly brings the target engine torque TTe close to TTout÷γn. At this time, the asymptotic time from TTout÷γn to TTout÷γa is desirably made equal to the asymptotic time of TTout at Step 608 shown in FIG. 6.

At Step 804, the power train control unit 100 decides whether the process is in the rotation synchronization control phase or not and when the process is not in the rotation synchronization control phase, goes to Step 805. When the process is in the rotation synchronization control phase, at Step 808, the unit 100 sets the target engine torque TTe=(TTout÷γa)+TTina.

At Step 805, the power train control unit 100 decides whether the process is in the engagement control phase or not and when the process is in the engagement control phase, at Step 809, sets TTe=TTout÷γa. When the process is not in the engagement control phase, at Step 810, the unit 100 sets the shifted gear ratio γm and slowly brings the target engine torque TTe close to TTout÷γm from TTout÷γa. Here, the asymptotic time at Step 810 is desirably set according to the driver request torque and furthermore, desirably set separately at each gear position to be engaged.

Figure 9:
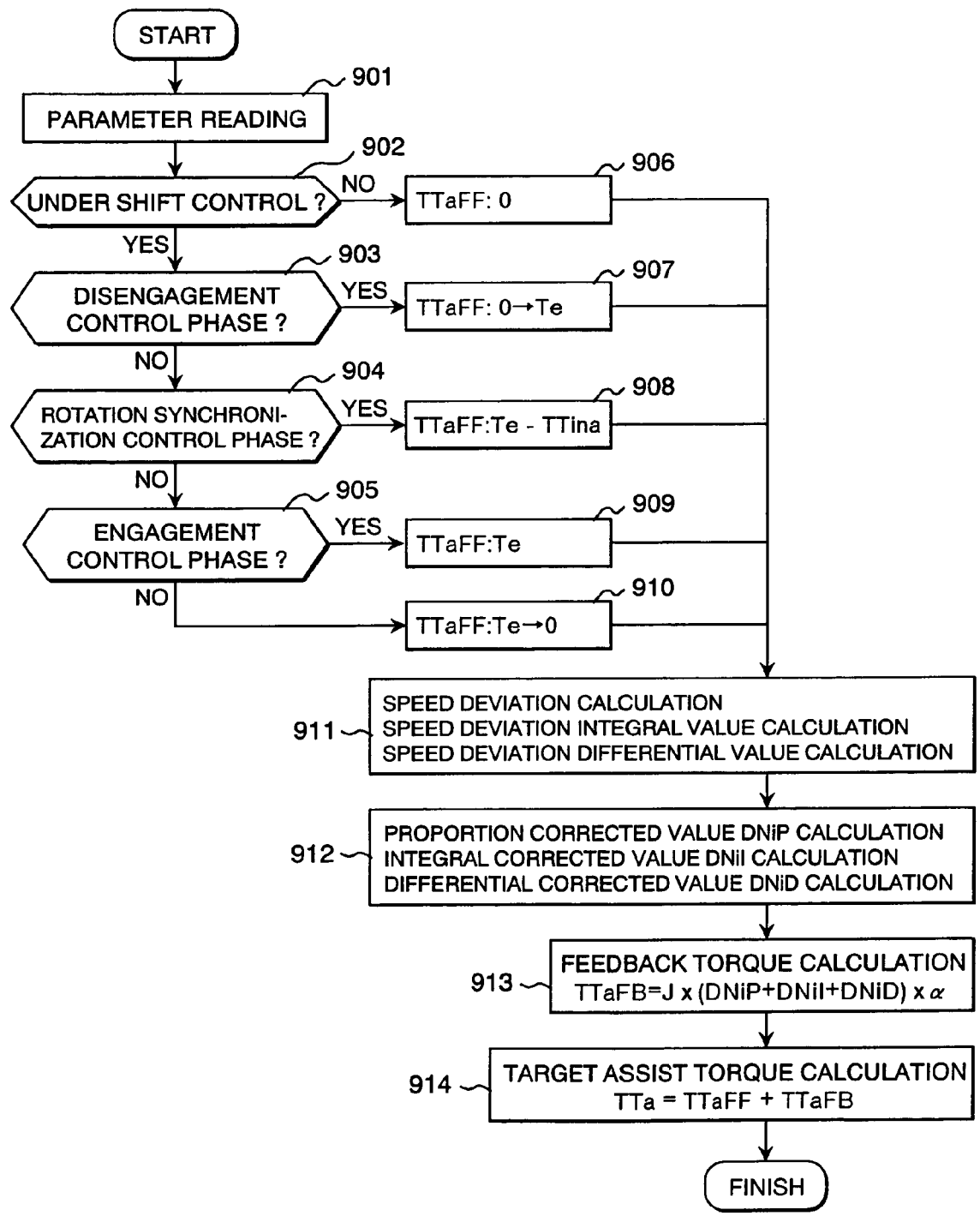
FIG. 9 is a control flow chart of the target assist torque control process shown in FIG. 5.

FIG. 9 shows the control flow at Step 504 (target assist torque operation) shown in FIG. 5.

At Step 901, the power train control unit 100 reads the parameter.

At Step 902, the power train control unit 100 decides whether the process is under shift control or not and when the process is during shifting, the unit 100 goes to Step 903. When the process is not during shifting, the unit 100 goes to Step 906, sets the target assist torque feed-forward value TTaFF=0, and goes to Step 911.

At Step 903, the power train control unit 100 decides whether the process is in the disengagement control phase or not and when the process is not in the disengagement control phase, goes to Step 904. When the process is in the disengagement control phase, the unit 100 goes to Step 907, slowly brings the target assist torque feed-forward value TTaFF close to the engine torque Te, and goes to Step 911.

At Step 904, the power train control unit 100 decides whether the process is in the rotation synchronization control phase or not and when the process is not in the rotation synchronization control phase, goes to Step 905. When the process is in the rotation synchronization control phase, the unit 100 goes to Step 908, sets the target assist torque feed-forward value TTaFF=engine torque Te−inertia torque TTina, and goes to Step 911.

At Step 905, the power train control unit 100 decides whether the process is in the engagement control phase or not and when the process is in the engagement control phase, the unit 100 goes to Step 909, sets the target assist torque feed-forward value TTaFF=engine torque Te, and goes to Step 911. When the process is not in the engagement control phase, the unit 100 goes to Step 910, slowly brings the target assist torque feed-forward value TTaFF close to 0, and goes to Step 911. Here, the time required for bringing the target assist torque feed-forward value TTaFF close to 0 is desirably made equal to the asymptotic time of TTe at Step 810 shown in FIG. 8.

Next, at Step 911, the power train control unit 100 calculates a deviation between the target input shaft speed TNi and the input shaft speed Ni, an integral value of the deviation, and a differential value of the deviation.

Next, at Step 912, the power train control unit 100 calculates a proportion corrected value DNiP, an integral corrected value DNiI, and a differential corrected value DNiD.

At Step 913, the power train control unit 100 calculates the target assist torque feedback value TTaFB. Here, the inertia coefficient from the engine to the input shaft is assumed as J, and the unit conversion coefficient is assumed as α, and the target assist torque feedback value TTaFB is calculated from TTaFB=J×(DNiP+DNiI+DNiD)×α.

Finally, at Step 914, the power train control unit 100 adds the feed-forward value to the feedback value and calculates the target assist torque TTa.

FIG. 10 shows a time chart of an example of the control at the time of up-shift from the first gear position to the second gear position when the constitution shown in FIGS. 4 to 9 is used.

In FIG. 10, the period from the time t1 to the time t3 is the disengagement control phase, and the period from the time t3 to the time t4 is the rotation synchronization control phase, and the period from the time t4 to the time t5 is the engagement control phase, and the period from the time t5 to the time t6 is the shift end phase.

Figure 10A:
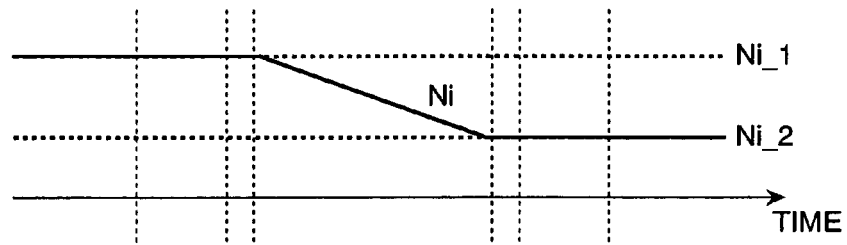
FIG. 10 is a time chart of each signal during the up-shift from the first gear position to the second gear position.
Figure 10B:
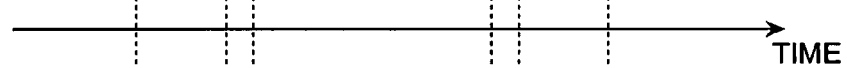
Figure 10C:
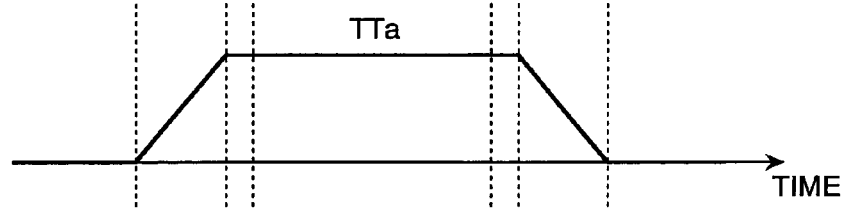
Figure 10D:
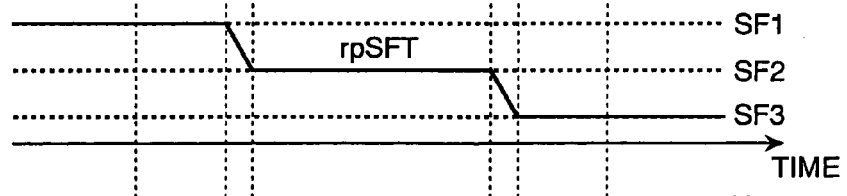
Figure 10E:
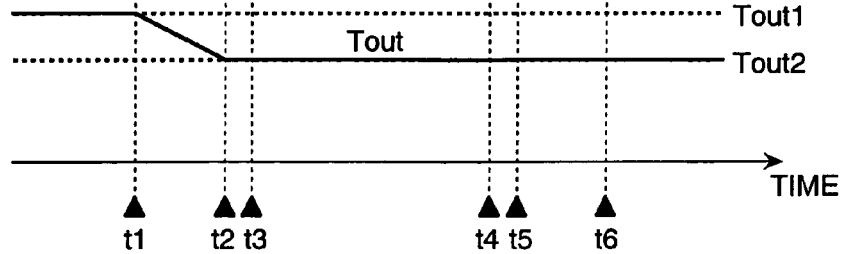

FIG. 10(A) shows the input shaft speed, the speed equivalent to the first gear position, and the speed equivalent to the second gear position. FIG. 10(B) shows the engine torque. FIG. 10(C) shows the assist clutch torque. FIG. 10(D) shows the shift position. FIG. 10(E) shows the transmission output shaft torque.

In the disengagement control phase, when the assist clutch torque is started up at the time t1, the engine torque (B) is simultaneously increased and the transmission output shaft torque (E) is slowly changed from the output shaft torque Tout1 equivalent to the current gear position to the output shaft torque Tout2 equivalent to the shifted gear position.

At the time t2 when the assist clutch torque (C) is fully started up, the shift position (D) is moved from the engagement position SF1 on the first gear side to the neutral position SF2 and the gear is disengaged.

When the shift position (D) approaches the neutral position SF2 (the time t3), the process enters the rotation synchronization control phase. In the rotation synchronization control phase, by the assist clutch torque (C), the input shaft speed (A) is synchronized with the speed Ni_2 equivalent to the second gear position from the speed Ni_1 equivalent to the first gear position and the engine torque (B), to prevent the transmission output shaft torque (E) from projecting greatly from the output shaft torque Tout2 equivalent to the shifted gear position, is downed in correspondence to the inertial torque TTina.

In the latter half of the rotation synchronization, to prevent an occurrence of torque pull-in due to the difference between the gear ratio γa at the assist clutch connection position and the gear ratio γm at the second gear position, that is, to make the transmission output shaft torque Tout equal to the output shaft torque Tout2 equivalent to the shifted gear position, the engine torque is increased.

At the point of time (time t4) when the speed is synchronized, the shift position (D) is moved from the neutral position SF2 to the engagement position SF3 on the second gear side.

At the time t5 when the shift position (D) is moved to the engagement position SF3 on the second gear side, the process enters the shift end phase, and the assist clutch torque (C) is slowly changed to 0, and the engine torque (B) is also reduced slowly.

At the time t6 when the assist clutch torque (C) is reduced to 0, the shift control is finished.

By use of such a constitution and by amplification of the engine torque, an occurrence of a sense of pull-in before and after gear disengagement and an occurrence of a sense of pull-in in the latter half of the rotation synchronization due to the difference between the gear ratio γa at the assist clutch connection position and the gear ratio γm at the shifted gear position can be avoided, and furthermore, an occurrence of a torque difference due to the difference between the gear ratio γa at the assist clutch connection position before and after gear engagement and the gear ratio γm at the shifted gear position can be avoided, and the operation performance (shift quality) can be prevented from reduction.

FIG. 11 shows a time chart of an example of the control at the time of down-shift from the second gear position to the first gear position when the constitution shown in FIGS. 4 to 9 is used.

In FIG. 11, the period from the time t1 to the time t3 is the disengagement control phase, and the period from the time t3 to the time t4 is the rotation synchronization control phase, and the period from the time t4 to the time t5 is the engagement control phase, and the period from the time t5 to the time t6 is the shift end phase.

FIG. 11(A) shows the input shaft speed, the speed equivalent to the first gear position, and the speed equivalent to the second gear position. FIG. 11(B) shows the engine torque. FIG. 11(C) shows the assist clutch torque. FIG. 11(D) shows the shift position. FIG. 11(E) shows the transmission output shaft torque.

In the disengagement control phase, when the assist clutch torque is started up at the time t1, the engine torque (B) is simultaneously increased and the transmission output shaft torque (E) is slowly changed from the output shaft torque Tout2 equivalent to the current gear position to the output shaft torque Tout1 equivalent to the shifted gear position.

At the time t2 when the assist clutch torque (C) is fully started up, the shift position (D) is moved from the engagement position SF3 on the second gear side to the neutral position SF2 and the gear is disengaged.

When the shift position (D) approaches the neutral position SF2 (the time t3), the process enters the rotation synchronization control phase. In the rotation synchronization control phase, by the assist clutch torque (C), the input shaft speed (A) is synchronized with the speed Ni_1 equivalent to the first gear position from the speed Ni_2 equivalent to the second gear position and the engine torque (B), to prevent the transmission output shaft torque (E) from being pulled in greatly from the output shaft torque Tout1 equivalent to the shifted gear position, is upped in correspondence to the inertial torque TTina.

In the latter half of the rotation synchronization, to prevent an occurrence of torque pull-in due to the difference between the gear ratio γa at the assist clutch connection position and the gear ratio γn at the first gear position, that is, to make the transmission output shaft torque Tout equal to the output shaft torque Tout1 equivalent to the shifted gear position, the engine torque is reduced.

At the point of time (time t4) when the speed is synchronized, the shift position (D) is moved from the neutral position SF2 to the engagement position SF1 on the first gear side.

At the time t5 when the shift position (D) is moved to the engagement position SF1 on the first gear side, the process enters the shift end phase, and the assist clutch torque (C) is slowly changed to 0, and the engine torque (B) is also reduced slowly, and an occurrence of a torque difference due to the difference between the gear ratio γa at the assist clutch connection position and the gear ratio γn at the first gear position is avoided.

At the time t6 when the assist clutch torque (C) is reduced to 0, the shift control is finished. By use of such a constitution and by amplification of the engine torque, an occurrence of a sense of pull-in before and after gear disengagement, an occurrence of a sense of pull-in in correspondence to the inertia torque generated at the time of rotation synchronization, and an occurrence of a sense of pull-in in the latter half of the rotation synchronization due to the difference between the gear ratio γa at the assist clutch connection position and the gear ratio γm at the shifted gear position can be avoided, and furthermore, an occurrence of a torque difference due to the difference between the gear ratio γa at the assist clutch connection position before and after gear engagement and the gear ratio γm at the shifted gear position can be avoided, and the operation performance (shift quality) can be prevented from reduction.

Next, by referring to FIGS. 12 to 14, the contents of shift control by the control apparatus for an automobile in a different embodiment from the embodiment shown in FIGS. 4 to 11 will be explained. The difference from the embodiment shown in FIGS. 4 to 11 is that Step 503 (target engine torque operation) shown in FIG. 5, which is shown in FIG. 8 in detail, is replaced with FIG. 12.

At Step 1201, the power train control unit 100 reads the parameter. At Step 1202, the power train control unit 100 decides whether the process is during shifting or not and when the process is during shifting, the unit 100 goes to Step 1203. When the process is not during shifting, at Step 1209, the unit 100 sets the target engine torque TTe=TTdrv.

At Step 1203, the power train control unit 100 decides whether the process is in the disengagement control phase or not and when the process is not in the disengagement control phase, goes to Step 1204. When the process is in the disengagement control phase, at Step 1210, the unit 100 sets the target engine torque TTe=TTdrv.

At Step 1204, the power train control unit 100 decides whether the process is in the rotation synchronization control phase or not and when the process is not in the rotation synchronization control phase, goes to Step 1205. When the process is in the rotation synchronization control phase, the unit 100 goes to Step 1208 and decides whether the up-shift is set or not. When the up-shift is set, at Step 1211, the unit 100 sets the current gear ratio γn, sets the gear ratio at the assist clutch connection position as γa, and slowly brings the target engine torque TTe close to (TTout÷γa)+TTina from TTout÷γn. When the up-shift is not set (in a case of down-shift), at Step 1212, the unit 100 sets TTe=TTdrv+TTina× Kin. Here, Kin indicates a parameter for adjusting the amplification amount of the engine torque.

At Step 1205, the power train control unit 100 decides whether the process is in the engagement control phase or not and when the process is not in the engagement control phase, goes to Step 1208. When the process is in the engagement control phase, the unit 100 goes to Step 1207 and decides whether the up-shift is set or not. When the up-shift is set, at Step 1213, the unit 100 sets TTe=TTout÷γa and when the down-shift is set, at Step 1214, the unit 100 sets TTe=TTdrv.

At Step 1208, the power train control unit 100 decides whether the up-shift is set or not. When the up-shift is set, at Step 1215, the unit 100 sets the shifted gear ratio γm and slowly brings the target engine torque TTe close to TTout÷γm from TTout÷γa. When the down-shift is set, at Step 1216, the unit 100 sets TTe=TTdrv.

Figure 12:
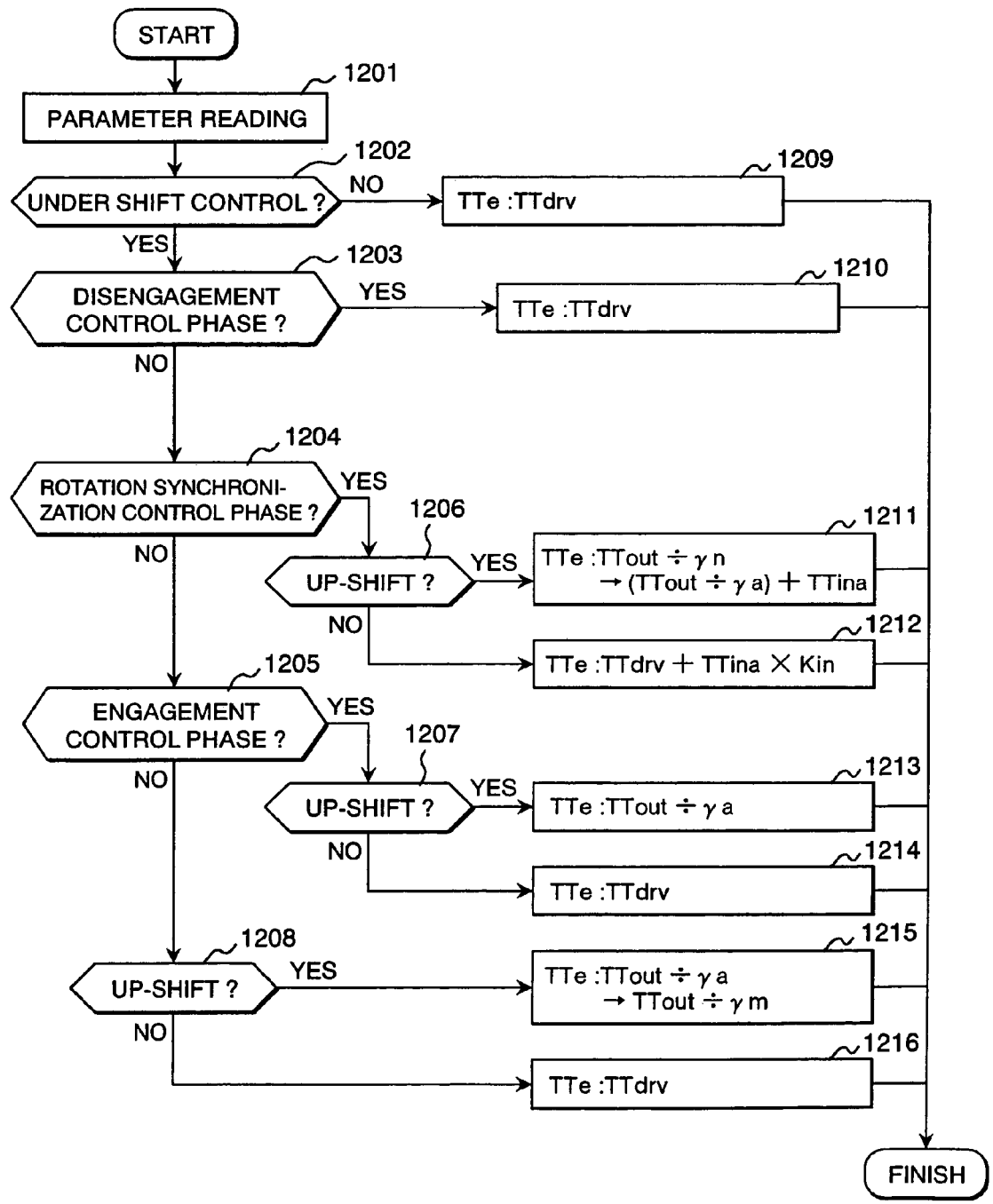
FIG. 12 is a control flow chart of a different embodiment from that of the target engine torque control shown in FIG. 8.

FIG. 13 shows a time chart of an example of the control at the time of up-shift from the first gear position to the second gear position when the constitution that Step 503 (target engine torque operation) shown in FIG. 5, which is shown in FIG. 8 in detail, is replaced with FIG. 12 is used.

In FIG. 13, the period from the time t1 to the time t3 is the disengagement control phase, and the period from the time t3 to the time t4 is the rotation synchronization control phase, and the period from the time t4 to the time t5 is the engagement control phase, and the period from the time t5 to the time t6 is the shift end phase.

Figure 13A:
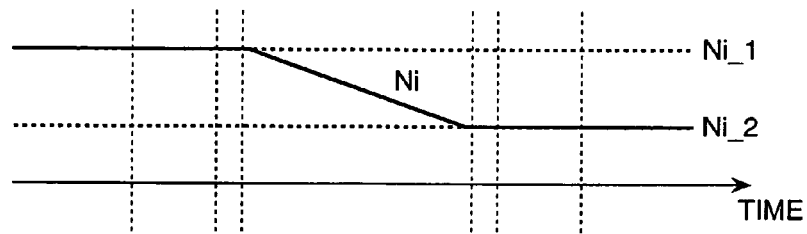
FIG. 13 is a time chart of each signal during the up-shift from the first gear position to the second gear position in a different embodiment from that of the control shown in FIG. 10.
Figure 13B:
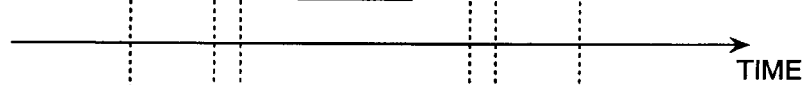
Figure 13C:
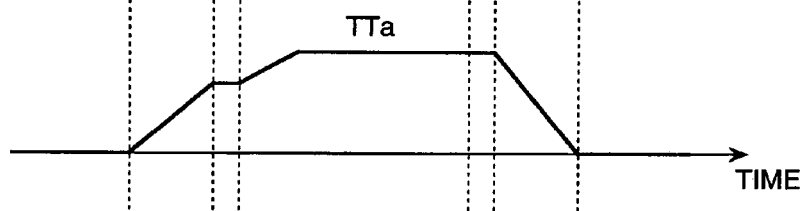
Figure 13D:
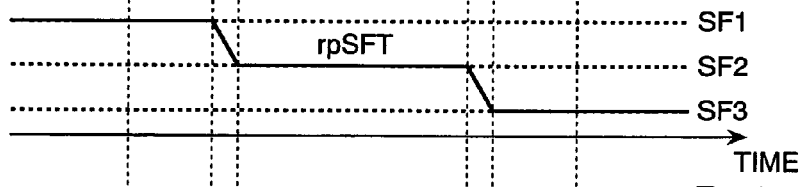
Figure 13E:
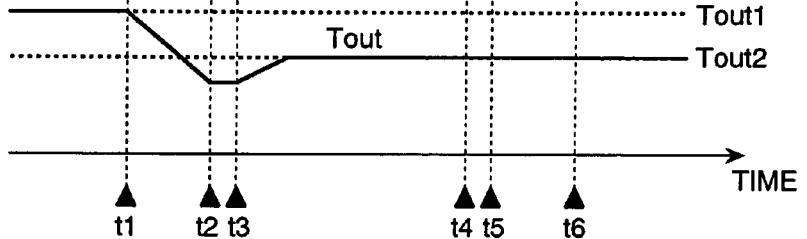

FIG. 13(A) shows the input shaft speed, the speed equivalent to the first gear position, and the speed equivalent to the second gear position. FIG. 13(B) shows the engine torque. FIG. 13(C) shows the assist clutch torque. FIG. 13(D) shows the shift position. FIG. 13(E) shows the transmission output shaft torque.

In the disengagement control phase, the assist clutch torque is started up at the time t1, and at the time t2 when the assist clutch torque (C) is fully started up, the shift position (D) is moved from the engagement position SF1 on the first gear side to the neutral position SF2, and the gear is disengaged.

When the shift position (D) approaches the neutral position SF2 (the time t3), the process enters the rotation synchronization control phase. In the rotation synchronization control phase, by the assist clutch torque (C), the input shaft speed (A) is synchronized with the speed equivalent to the second gear position, and the engine torque (B), to prevent the transmission output shaft torque (E) from projecting greatly from the output shaft torque Tout2 equivalent to the shifted gear position, is downed in correspondence to the inertial torque TTina, and in the latter half of the rotation synchronization, to prevent an occurrence of torque pull-in due to the difference between the gear ratio γa at the assist clutch connection position and the gear ratio γm at the second gear position, that is, to make the transmission output shaft torque Tout equal to the output shaft torque Tout2 equivalent to the shifted gear position, the engine torque is increased.

At the point of time (time t4) when the speed is synchronized, the shift position (D) is moved from the neutral position SF2 to the engagement position SF3 on the second gear side. At the time t5 when the shift position (D) is moved to the engagement position SF3 on the second gear side, the process enters the shift end phase, and the assist clutch torque (C) is slowly changed to 0, and the engine torque (B) is also reduced slowly, and at the time t6 when the assist clutch torque (C) is reduced to 0, the shift control is finished.

By use of such a constitution and by amplification of the engine torque, an occurrence of a sense of pull-in in the latter half of the rotation synchronization due to the difference between the gear ratio γa at the assist clutch connection position and the gear ratio γm at the shifted gear position can be avoided, and furthermore, an occurrence of a torque difference due to the difference between the gear ratio γa at the assist clutch connection position before and after gear engagement and the gear ratio γm at the shifted gear position can be avoided, and the operation performance (shift quality) can be prevented from reduction.

FIG. 14 shows a time chart of an example of the control at the time of down-shift from the second gear position to the first gear position when the constitution that Step 503 (target engine torque operation) shown in FIG. 5, which is shown in FIG. 8 in detail, is replaced with FIG. 12 is used.

In FIG. 14, the period from the time t1 to the time t3 is the disengagement control phase, and the period from the time t3 to the time t4 is the rotation synchronization control phase, and the period from the time t4 to the time t5 is the engagement control phase, and the period from the time t5 to the time t6 is the shift end phase.

Figure 14A:
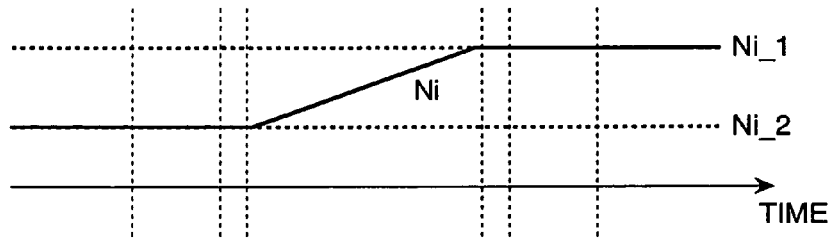
FIG. 14 is a time chart of each signal during the downshift from the second gear position to the first gear position in a different embodiment from that of the control shown in FIG. 11.
Figure 14B:
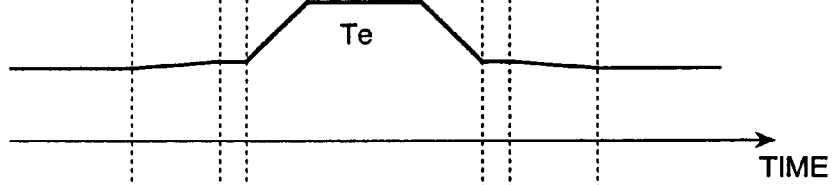

FIG. 14(A) shows the input shaft speed, the speed equivalent to the first gear position, and the speed equivalent to the second gear position. FIG. 14(B) shows the engine torque.

Figure 14C:
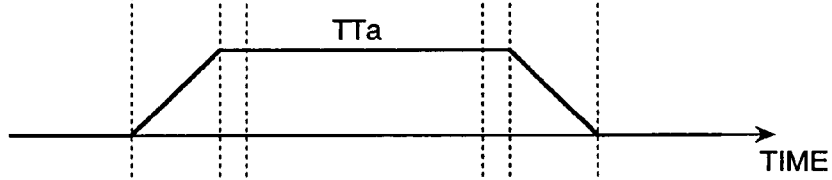
Figure 14D:
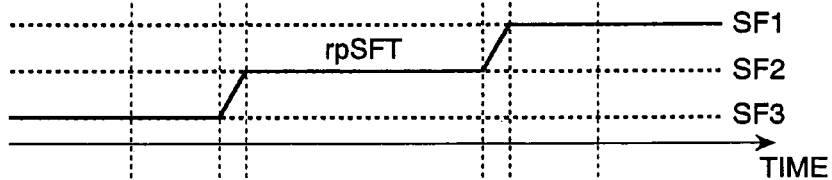
Figure 14E:
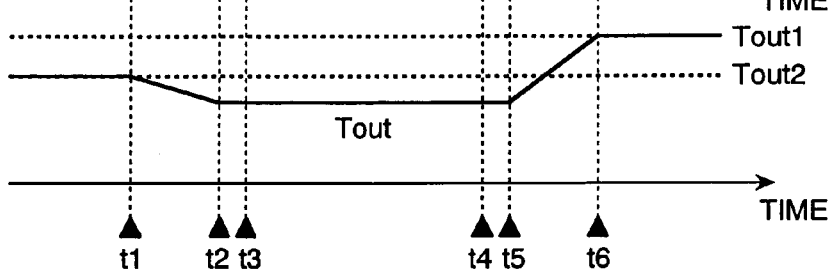

FIG. 14(C) shows the assist clutch torque. FIG. 14(D) shows the shift position. FIG. 14(E) shows the transmission output shaft torque.

In the disengagement control phase, the assist clutch torque is started up at the time t1, and at the time t2 when the assist clutch torque (C) is fully started up, the shift position (D) is moved from the engagement position SF3 on the second gear side to the neutral position SF2, and the gear is disengaged.

When the shift position (D) approaches the neutral position SF2 (the time t3), the process enters the rotation synchronization control phase. In the rotation synchronization control phase, by the assist clutch torque (C), the input shaft speed (A) is synchronized with the speed equivalent to the second gear position. At this time, the engine torque (B), to prevent the transmission output shaft torque (E) from being pulled in greatly, is upped in correspondence to the inertial torque TTina.

At the point of time (time t4) when the speed is synchronized, the shift position (D) is moved from the neutral position SF2 to the engagement position SF1 on the first gear side. At the time t5 when the shift position (D) is moved to the engagement position SF1 on the first gear side, the process enters the shift end phase, and at the time t6 when the assist clutch torque (C) is reduced to 0, the shift control is finished.

By use of such a constitution and by amplification of the engine torque, an occurrence of a sense of pull-in in correspondence to the inertia torque generated at the time of rotation synchronization can be avoided and the operation performance (shift quality) can be prevented from reduction. Further, by adjusting the engine torque amplification amount adjustment parameter Kin at Step 1212, in the rotation synchronization control phase in the period from the time t3 to the time t4, the engine torque (B) and the assist clutch torque (C) are adjusted, and the transmission output shaft torque (E) can be adjusted, and the degree of an occurrence of a sense of pull-in in correspondence to the inertia torque generated at the time of rotation synchronization can be adjusted.

Figure 15:
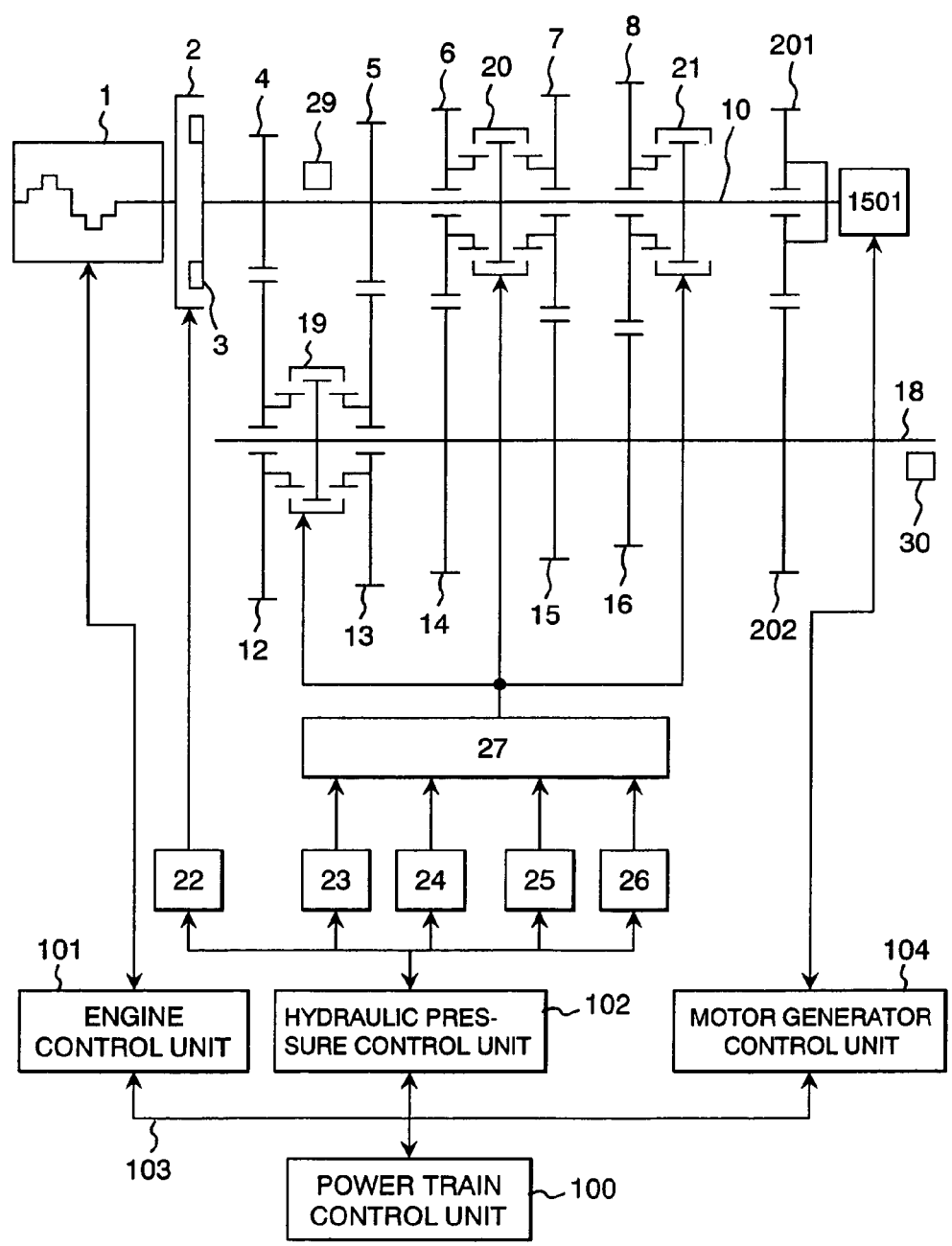
FIG. 15 is a whole block diagram of the automatic transmission showing the third embodiment of the present invention.

Next, the third configuration example of the control apparatus for an automobile relating to the present invention will be explained by referring to FIG. 15. FIG. 15 is a skeleton diagram of the third system configuration example showing an embodiment of the control apparatus for an automobile relating to the present invention. Further, the same numerals as those shown in FIG. 1 indicate the same parts.

A difference of this configuration example from that of the embodiment shown in FIG. 1 is that in the configuration example shown in FIG. 1, the transfer torque variable means is composed of the assist clutches 203 and 204, while in this configuration example, it is composed of a motor generator 1501. The seventh drive gear 201 is connected to the motor generator 1501, and the current of the motor generator 1501 is controlled by the motor generator control unit 104, so that the rotation torque of the transmission input shaft 10 is transferred to the transmission output shaft 18. The same control as that of the assist clutch in the embodiment shown in FIG. 1 is executed for the motor generator 1501, thus it can be shifted.

Figure 16:
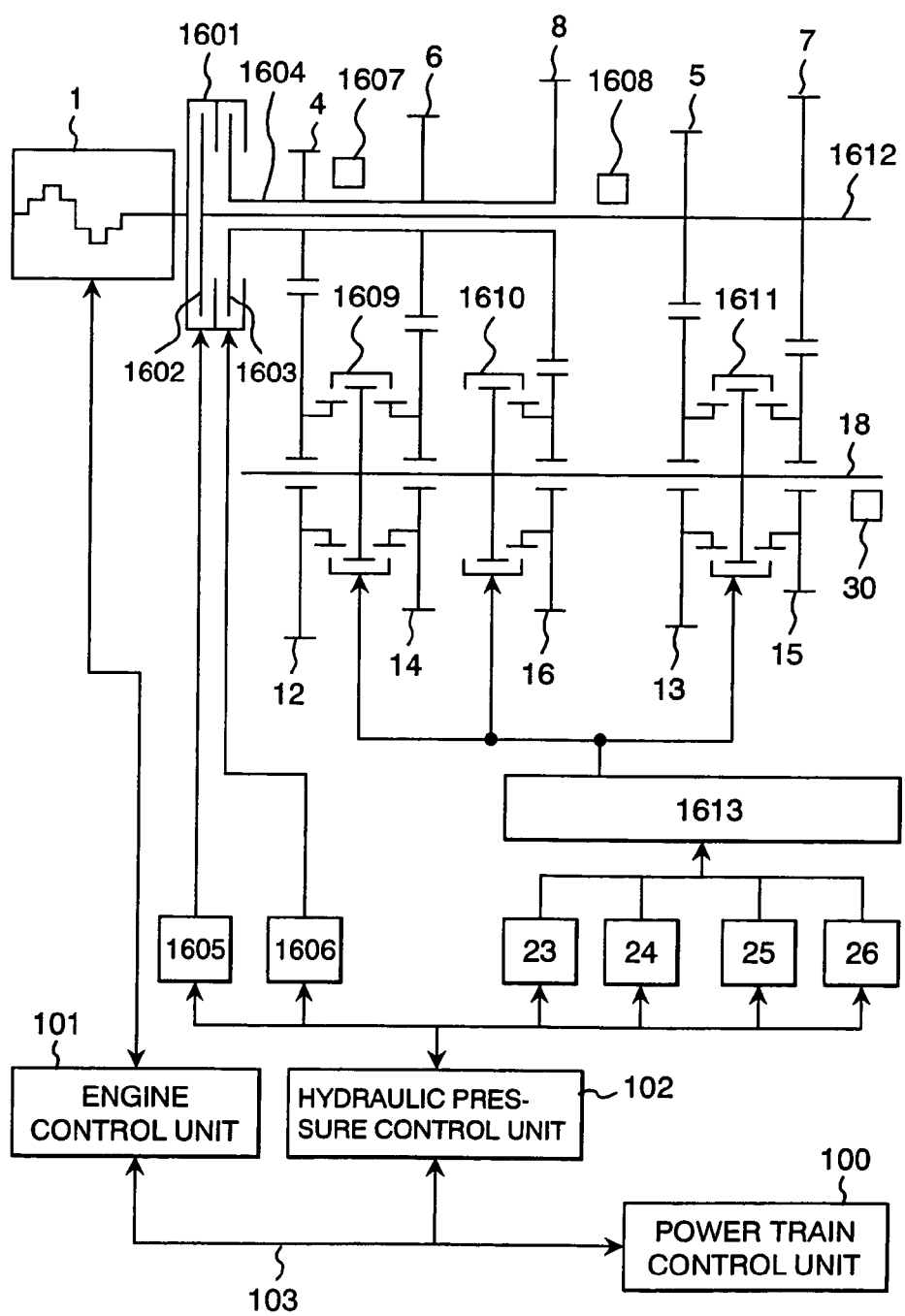
FIG. 16 is a whole block diagram of the automatic transmission showing the fourth embodiment of the present invention.

Next, the fourth configuration example of the control apparatus for an automobile relating to the present invention will be explained by referring to FIG. 16. FIG. 16 is a skeleton diagram of the fourth system configuration example showing an embodiment of the control apparatus for an automobile relating to the present invention. Further, the same numerals as those shown in FIG. 1 indicate the same parts.

A difference of this configuration example from the configuration example shown in FIG. 1 is that the configuration example shown in FIG. 1 is structured so as to transfer the torque of the engine 1 to the transmission input shaft 10 by engagement of the input shaft clutch input disk 2 and the input shaft clutch output disk 3, while this configuration example is composed of a twin clutch. Namely, the engine 1 is connected directly to an input shaft clutch input disk 1601, an input shaft clutch first output disk 1602 directly to a transmission first input shaft 1612, and an input shaft clutch second output disk 1603 directly to a transmission second input shaft 1604. The transmission second input shaft 1604 is hollow and the transmission first input shaft 1612 passes through the hollow of the transmission second input shaft 1604 and is structured so as to execute relative motion in the rotational direction to the transmission second input shaft 1604. To the transmission second input shaft 1604, the first drive gear 4, the third drive gear 6, and the fifth drive gear 8 are fixed and on the transmission first input shaft 1612, they are installed rotatably. Further, to the transmission first input shaft 1612, the second drive gear 5 and the fourth drive gear 7 are fixed and on the transmission second input shaft 1604, they are installed rotatably. Engagement and disengagement of the input shaft clutch input disk 1601 and the input shaft clutch first output disk 1602 are executed by an input shaft clutch first actuator 1605 and engagement and disengagement of the input shaft clutch input disk 1601 and the input shaft clutch second output disk 1603 are executed by an input shaft clutch second actuator 1606.

And, between the first driven gear 12 and the third driven gear 14, a first mesh type transfer means 1609 for engaging the first driven gear 12 with the transmission output shaft 18 and engaging the third driven gear 14 with the transmission output shaft 18 is installed. Therefore, the rotation torque transferred from the first drive gear 4 to the first driven gear 12 or from the third drive gear 6 to the third driven gear 14 is transferred to the transmission output shaft 18 via the first mesh type transfer means 1609.

Further, between the second driven gear 13 and the fourth driven gear 15, a third mesh type transfer means 1611 for engaging the second driven gear 13 with the transmission output shaft 18 and engaging the fourth driven gear 15 with the transmission output shaft 18 is installed. Therefore, the rotation torque transferred from the second drive gear 5 to the second driven gear 13 or from the fourth drive gear 7 to the fourth driven gear 15 is transferred to the transmission output shaft 18 via the third mesh type transfer means 1611.

Further, on the fifth driven gear 16, a second mesh type transfer means 1610 for engaging the fifth driven gear 16 with the transmission output shaft 18 is installed. Therefore, the rotation torque transferred from the fifth drive gear 8 to the fifth driven gear 16 is transferred to the transmission output shaft 18 via the second mesh type transfer means 1610.

As mentioned above, to transfer the rotation torque of the transfer first input shaft 1612 and the transmission second input shaft 1604 to the first mesh type transfer means 1609 or the second mesh type transfer means 1610 or the third mesh type transfer means 1611, it is necessary to move any one of the first mesh type transfer means 1609, the second mesh type transfer means 1610, and the third mesh type transfer means 1611 in the axial direction of the transmission output shaft 18 and engage it with any one of the first driven gear 12, the second driven gear 13, the third driven gear 14, the fourth driven gear 15, and the fifth driven gear 16 and to move any one of the first mesh type transfer means 1609, the second mesh type transfer means 1610, and the third mesh type transfer means 1611, a shift/select mechanism 1613 is operated by the shift first actuator 23, the shift second actuator 24, the select first actuator 25, and the select second actuator 26.

For example, assuming that the first gear position transfers the torque to the transmission output shaft 18 by the first drive gear 4 and the first driven gear 12, and the third gear position transfers the torque to the transmission output shaft 18 by the third drive gear 6 and the third driven gear 14, and the fourth gear position transfers the torque to the transmission output shaft 18 by the fourth drive gear 7 and the fourth driven gear 15, the up-shift from the first gear position to the third gear position and the down-shift from the third gear position to the first gear position, when the input shaft first output disk 1602 is disengaged, and the third mesh type transfer means 1611 and the fourth driven gear 15 are engaged, and then the input shaft clutches (1601, 1602) are controlled similarly to the assist clutch, can be controlled in the same way as with the shifting by controlling the assist clutch in the embodiment shown in FIG. 1.

Further, for example, assuming that the second gear position transfers the torque to the transmission output shaft 18 by the second drive gear 5 and the second driven gear 13, and the fourth gear position transfers the torque to the transmission output shaft 18 by the fourth drive gear 7 and the fourth driven gear 15, and the fifth gear position transfers the torque to the transmission output shaft 18 by the fifth drive gear 8 and the fifth driven gear 16, the up-shift from the second gear position to the fourth gear position and the down-shift from the fourth gear position to the second gear position, when the input shaft second output disk 1603 is disengaged, and the second mesh type transfer means 1610 and the fifth driven gear 16 are engaged, and then the input shaft clutches (1601, 1603) are controlled similarly to the assist clutch, can be controlled in the same way as with the shifting by controlling the assist clutch in the embodiment shown in FIG. 1.

Figure 17:
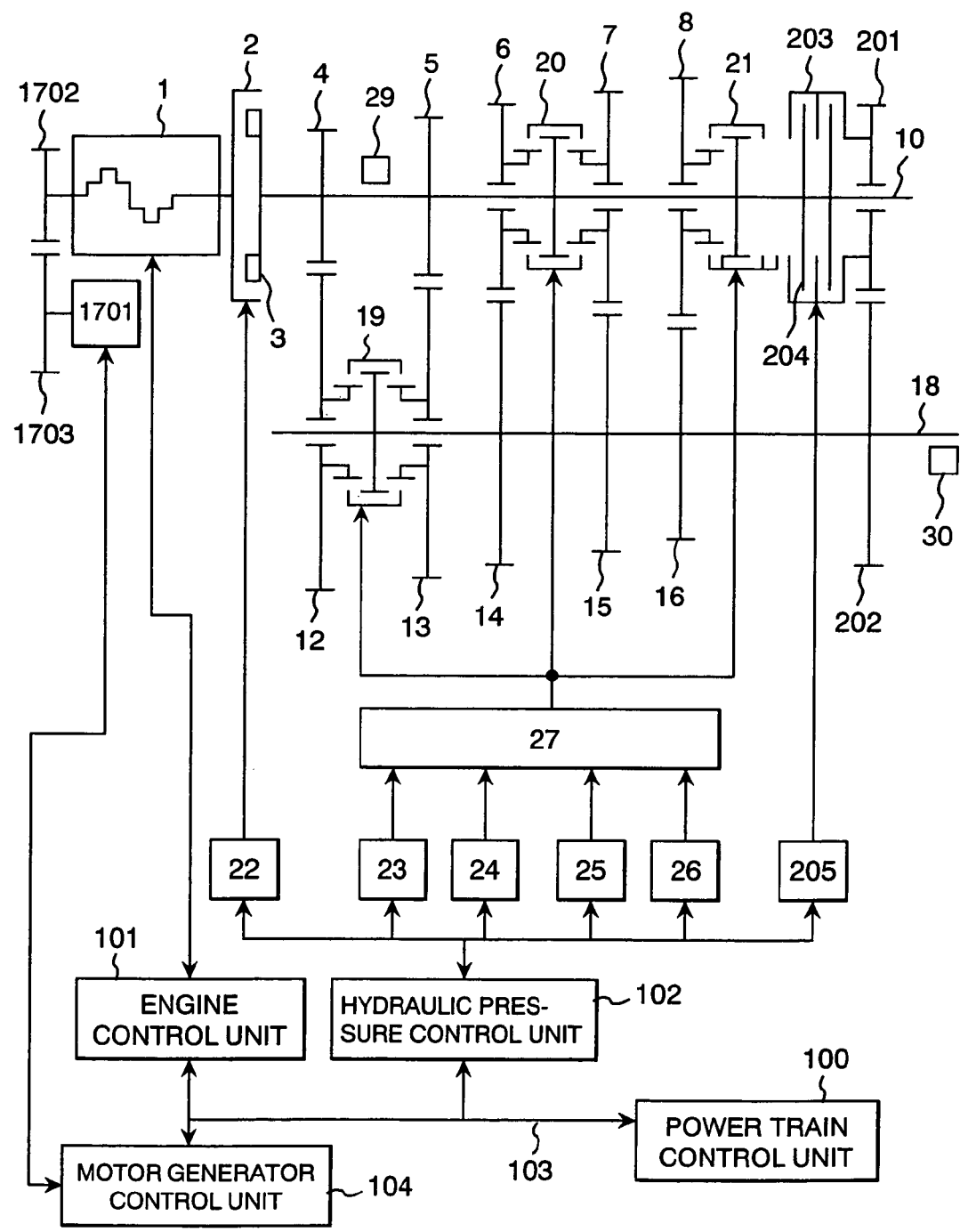
FIG. 17 is a whole block diagram of the automatic transmission showing the fifth embodiment of the present invention.

Next, the fifth configuration example of the control apparatus for an automobile relating to the present invention will be explained by referring to FIG. 17. FIG. 17 is a skeleton diagram of the fifth system configuration example showing an embodiment of the control apparatus for an automobile relating to the present invention. Further, the same numerals as those shown in FIG. 1 indicate the same parts.

A difference of this configuration example from the configuration example shown in FIG. 1 is that unlike the configuration example shown in FIG. 1, in this configuration example, a motor generator 1701 is connected to the engine 1 via gears 1702 and 1703. Increased torque and decreased torque of the engine torque in the embodiment shown in FIG. 1 are produced by the motor generator and the engine is operated stationarily, thus the same control as that for the shifting by controlling the engine torque in the embodiment shown in FIG. 1 can be executed.

According to the present invention, the shifting can be carried out without generating a sense of pull-in during shifting and the shift quality can be prevented from reduction.

Meaning of reference signs in figures are as follows:
1: Engine, 2: Input shaft clutch input disk, 3: Input shaft clutch output disk, 4: First drive gear, 5: Second drive gear, 6: Third drive gear, 7: Fourth drive gear, 8: Fifth drive gear, 10: Transmission input shaft, 12: First driven gear, 13: Second driven gear, 14: Third driven gear, 15: Fourth driven gear, 16: Fifth driven gear, 18: Transmission output shaft, 19: First mesh type transfer means, 20: Second mesh type transfer means, 21: Third mesh type transfer means, 22: Input shaft clutch actuator, 23: Shift first actuator, 24: Shift second actuator, 25: Select first actuator, 26: Select second actuator, 27: Shift/select mechanism, 29: Input shaft speed sensor, 30: Output shaft speed sensor, 100: Power train control unit, 101: Engine control unit, 102: Hydraulic pressure control unit, 201: Seventh drive gear, 202: Seventh driven gear, 203: Assist clutch input disk, 204: Assist clutch output disk, 205: Assist clutch actuator

What is claimed is:

1. An automobile control method having a driving force source for generating driving force and a gear type transmission having a plurality of torque transfer mechanism capable of transferring torque from an input shaft to an output shaft and a plurality of gear pairs, wherein;
    by said plurality of torque transfer mechanism and said plurality of gear pairs, at least one of a first, second and third torque transfer path from said input shaft to said output shaft are formed, and at least one of said torque transfer mechanism is a transfer torque variable mechanism capable of adjusting transfer torque, and at least one of other torque transfer mechanism is a mesh type transfer mechanism, and said transfer torque variable mechanism is controlled, thus said first torque transfer path is switched to said second torque transfer path to carry out shifting, and
    during a period of transferring at least a part of torque of said driving power source by said transfer torque variable mechanism, said torque of said driving power source is controlled at least once so as to increase to a value greater than said torque before start of said period to carry out shifting.

2. A automobile control method according to claim 1, wherein;
    among said period of transferring at least a part of said torque of said driving power source by said transfer torque variable mechanism, during a period of moving of said mesh type transfer mechanism forming said first torque transfer path to an unmeshed position, said torque of said driving force source is controlled by said transfer torque variable mechanism so as to increase to a value greater than said torque before transferring at least a part of said torque of said driving force source.

3. An automobile control method according to claim 2, wherein
    by said transfer torque variable mechanism, said torque value of said driving force source before starting torque transfer is multiplied by a gear ratio of said first torque transfer path and additionally is divided by a gear ratio of said third torque transfer path formed by said transfer torque variable mechanism to provide a calculated value, and said torque of said driving force source is controlled so as to increase to said calculated value.

4. An automobile control method according to claim 2, wherein
    said transfer torque variable mechanism controls so as to start transferring at least a part of said torque of said driving power source and simultaneously start increasing said torque of said driving force source.

5. A automobile control method an according to claim 1, wherein among said period of transferring at least a part of said torque of said driving power source by said transfer torque variable mechanism, during a period of changing a speed of said input shaft from a speed equivalent to the current gear position to a speed equivalent to the shifted gear position, said torque of said driving force source is controlled by said transfer torque variable mechanism so as to increase to a value greater than said torque before transferring at least a part of said torque of said driving force source.

6. An automobile control method according to claim 5, wherein to increase said transfer torque of said transfer torque variable mechanism larger than 0, said torque of said driving force source is controlled by said transfer torque variable mechanism so as to increase to a value greater than said torque before transferring at least a part of said torque of said driving force source.

7. An automobile control method according to claim 1, wherein among said period of transferring at least a part of said torque of said driving power source by said transfer torque variable mechanism, during a period from before moving at least said mesh type transfer mechanism forming said second torque transfer path to a meshed position until said torque transfer by said transfer torque variable mechanism is released, said torque of said driving force source is controlled by said transfer torque variable mechanism so as to increase to a value greater than said torque before transferring at least a part of said torque of said driving force source.

8. A automobile control method according to claim 7, wherein by said transfer torque variable mechanism, said torque value of said driving force source before starting torque transfer is multiplied by a gear ratio of said second torque transfer path and additionally is divided by a gear ratio of said third torque tranfer path formed by said transfer torque variable mechanism to provide a calculated value, and said torque of said driving force source is controlled so as to increase to said calculated value.

9. An automobile control method according to claim 7, wherein said transfer torque variable mechanism is started to be disengaged and simultaneously said increased torque of said driving force source is controlled to start reduction.

10. An automobile control apparatus comprising a driving force source for generating driving force, a gear type transmission having a plurality of torque transfer mechanism capable of transferring torque from an input shaft to an output shaft and a plurality of gear pairs, shift control mechanism wherein by said plurality of torque transfer mechanism and said plurality of gear pairs, a plurality of torque transfer paths from said input shaft to said output shaft are formed, and at least one of said torque transfer mechanism is a transfer torque variable mechanism capable of adjusting transfer torque, and at least one of other torque transfer mechanism is a mesh type transfer mechanism, and said transfer torque variable mechanism is controlled, thus said first torque transfer path is switched to said second torque transfer path to carry out shifting, and shift control mechanism, during a period of transferring at least a part of torque of said driving power source by said transfer torque variable mechanism, for controlling at least once said torque of said driving power source so as to increase to a value greater than torque before start of said period and carrying out shifting.

11. An automobile control apparatus, wherein a clutch installed on a gear train on an input shaft or a gear train on an output shaft is engaged or disengaged, thus a plurality of torque transfer paths transferred from a driving source to said output shaft are switched to carry out shifting, and said clutch constituting one torque transfer path has a function for supplementing transfer torque between said input and output shafts when another torque transfer path is to be switched and said driving source is controlled so as to make said input shaft torque during said switching period of said torque transfer path larger than said input shaft torque immediately before said switching period of said torque transfer path.

12. An automobile control apparatus, wherein a clutch installed on a gear train on an input shaft or a gear train on an output shaft is engaged or disengaged, thus a plurality of torque transfer paths transferred from a driving source to said output shaft are switched to carry out shifting, and said clutch constituting one torque transfer path has a function for supplementing transfer torque between said input and output shafts when another torque transfer path is to be switched and said driving source is controlled during a disengagement period of said clutch of said torque transfer path before shifting so as to output torque larger than said torque outputted by said driving source before said disengagement period.

13. An automobile control apparatus, wherein a clutch installed on a gear train on an input shaft or a gear train on an output shaft is engaged or disengaged, thus a plurality of torque transfer paths transferred from a driving source to said output shaft are switched to carry out shifting, and said clutch constituting one torque transfer path has a function for supplementing transfer torque between said input and output shafts when another torque transfer path is to be switched and said driving source is controlled during an engagement period of said clutch of said torque transfer path after shifting so as to output torque larger than said torque outputted by said driving source immediately before said switching period of said torque transfer path.

14. An automobile control apparatus, wherein a clutch installed on a gear train on an input shaft or a gear train on an output shaft is engaged or disengaged, thus a plurality of torque transfer paths transferred from an engine to said output shaft are switched to carry out shifting, and said clutch constituting one torque transfer path is an assist clutch for supplementing transfer torque between said input and output shafts when another torque transfer path is to be switched and said engine is controlled so that torque of said engine during said switching period of said torque transfer path approaches target engine torque obtained in consideration of a gear ratio of said assist clutch to requested output shaft torque.

15. An automobile control apparatus according to claim 14, wherein during said switching period of said torque transfer path and at a stage of synchronization of an input shaft speed and a speed of a gear train on the engagement side, said engine is controlled so that torque of said engine approaches target engine torque obtained in consideration of a gear ratio of said assist clutch and inertia torque from said engine to said input shaft to requested output shaft torque.

16. A transmission control apparatus, wherein a clutch installed on a gear train on an input shaft or a gear train on an output shaft is engaged or disengaged, thus a plurality of torque transfer paths transferred from a driving source to said output shaft are switched to carry out shifting, and said clutch constituting one torque transfer path has a function for supplementing transfer torque between said input and output shafts when another torque transfer path is to be switched and to said control apparatus for controlling said driving source so as to make said input shaft torque during said switching period of said torque transfer path larger than said input shaft torque immediately before said switching period of said torque transfer path, a signal is output.

17. An automobile, wherein a clutch installed on a gear train on an input shaft or a gear train on an output shaft is engaged or disengaged, thus a plurality of torque transfer paths transferred from a driving source to said output shaft are switched to carry out shifting, and said clutch constituting one torque transfer path has a function for supplementing transfer torque between said input and output shafts when another torque transfer path is to be switched and said input shaft torque during said switching period of said torque transfer path is larger than said input shaft torque immediately before said switching period of said torque transfer path.

* * * * *